United States Patent
Reed et al.

(10) Patent No.: US 11,418,264 B2
(45) Date of Patent: Aug. 16, 2022

(54) METHOD AND SYSTEM FOR ELECTRO-OPTIC MODULATION

(71) Applicant: University of Southampton, Southampton (GB)

(72) Inventors: Graham Trevor Reed, Southampton (GB); Ke Li, Southampton (GB); Sheghao Liu, Southampton (GB); David John Thomson, Southampton (GB)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 17/436,192

(22) PCT Filed: Feb. 26, 2020

(86) PCT No.: PCT/GB2020/050454
§ 371 (c)(1),
(2) Date: Sep. 3, 2021

(87) PCT Pub. No.: WO2020/178555
PCT Pub. Date: Sep. 10, 2020

(65) Prior Publication Data
US 2022/0131616 A1    Apr. 28, 2022

(30) Foreign Application Priority Data
Mar. 5, 2019 (GB) .................................... 1902951

(51) Int. Cl.
*H04B 10/2507* (2013.01)
*H04B 10/54* (2013.01)
(Continued)

(52) U.S. Cl.
CPC ..... *H04B 10/541* (2013.01); *H04B 10/07951* (2013.01); *H04B 10/2513* (2013.01); *H04B 10/2507* (2013.01)

(58) Field of Classification Search
None
See application file for complete search history.

(56) References Cited

U.S. PATENT DOCUMENTS 5,157,744 A * 10/1992 Korotky ........... H04B 10/25077
                                                    385/9
8,437,638 B2 * 5/2013 Kobayashi ........... H04B 10/548
                                                    398/90
(Continued)

FOREIGN PATENT DOCUMENTS

| JP | 2012015915 A | 1/2012 |
| WO | 01/67648 A2 | 9/2001 |
| WO | 01/67648 A3 | 9/2001 |

OTHER PUBLICATIONS

Cheng Wang et al., "Integrated lithium niobate electro-optic modulators operating at CMOS-compatible voltages", Nature, vol. 562, pp. 101-104, 2018.
(Continued)

*Primary Examiner* — Jai M Lee
(74) *Attorney, Agent, or Firm* — Renner, Otto, Boisselle & Sklar, LLP

(57) ABSTRACT

An optical modulation system comprises a signal source configured to generate an amplitude modulated electrical signal having a bandwidth and divided into frequency components comprising at least a first frequency component covering a first portion of the bandwidth and a second frequency component covering a second portion of the bandwidth; and an electro-optic modulator for receiving an input optical signal, the modulator having a first optical path and a second optical path, the input optical signal being
(Continued)

divided between the first optical path and the second optical path and recombined after propagation along the first optical path and the second optical path to produce an output optical signal, and at least one of the first optical path and the second optical path comprising a phase shifter comprising a pair of electrodes in which each electrode is configured to receive a driving signal; wherein the or each phase shifter is coupled to the signal source to receive at least one of said frequency components as a driving signal for an electrode, and the phase shifters are arranged such that the or each phase shifter receives a different pair of driving signals.

38 Claims, 12 Drawing Sheets

(51) Int. Cl.
*H04B 10/2513* (2013.01)
*H04B 10/079* (2013.01)

(56) References Cited

U.S. PATENT DOCUMENTS

| | | | | |
|---|---|---|---|---|
| 9,570,879 | B2* | 2/2017 | Hara | G01J 3/10 |
| 9,939,708 | B2* | 4/2018 | Aimone | G02F 1/2257 |
| 9,977,266 | B2* | 5/2018 | Sugamata | G02F 1/225 |
| 2012/0230627 | A1* | 9/2012 | Motoya | G02F 1/0356 |
| | | | | 385/3 |
| 2017/0075187 | A1 | 3/2017 | Aimone et al. | |
| 2021/0194586 | A1* | 6/2021 | Middlebrook | H04B 10/2575 |

OTHER PUBLICATIONS

Miaofeng Li et al., "Silicon intensity Mach-Zehnder modulator for single lane 100 GB/s applications", Photonics Research, vol. 6(2), p. 109, 2018.

Xi Chen et al., "All-electronic 100 GHz bandwidth digital-to-analog converter generating PAM signals upto 190 Gbaud", Journal of Lightwave Technology, vol. 35(3), pp. 411-417, 2017.

D Hillerkuss, "High-quality optical frequency comb by spectral splicing of spectra broadened by SPM", IEEE Photonics Journal, vol. 5(5), 2013.

Michael Vanhoecke et al., "Segmented optical transmitter comprising a CMOS driver array and an InP IQ-MZM for advanced modulation formats", Journal of Lightwave Technology, vol. 35(4), 2017.

Iria Garcia Lopez et al, "High-speed ultralow-power hybrid optical transmitter module with InP IIQ-SEMZM and BiCMOS drivers with 4-b integrated DAC", IEEE TMTT, vol. 64(12), 2016

Kapil Debnath et al., "All-silicon carrier accumulation modulator based on a lateral metal-oxide-semiconductor capacitor", Photonic Research, vol. 6(5), 2018.

GT Reed et al., "Silicon optical modulators", Nature Photonics, vol. 4, pp. 518-526, 2010.

International Search Report and Written Opinion dated Jun. 4, 2020 in International Application No. PCT/GB2020/050454.

United Kingdom Search Report dated Aug. 16, 2019 in corresponding United Kingdom Application No. GB1902951.1.

* cited by examiner

METHOD AND SYSTEM FOR ELECTRO-OPTIC MODULATION

This application is a national phase of International Application No. PCT/GB2020/050454 filed Feb. 26, 2020, which claims priority to United Kingdom Application No. 1902951.1 filed Mar. 5, 2019, the entire disclosures of which are hereby incorporated by reference.

BACKGROUND OF THE INVENTION

The present invention relates to methods and systems for electro-optic modulation.

An electro-optic modulator is a device capable of translating high-speed electronic signals into optical signals by converting an amplitude modulation of the voltage of an electronic signal into an amplitude or phase modulation of the optical power of an optical signal. These modulators are critical components enabling the transmission of data in modern telecommunication networks and micro-wave photonic systems, where there is a requirement for operating at very high speeds across a wide frequency range comprising multiple data channels carried on different frequencies. The speed of communication of data over a channel is conventionally measured in bauds (Bd, baud rate), which indicates the symbol rate or modulation rate, being the number of symbol changes per second in a modulated data signal. The data is represented as bits, and the baud rate is related to the bit rate (number of bits per second, b/s). In simple modulation arrangements in which data is represented by only two symbol states (typically 0 and 1) the baud rate and the bit rate are equivalent. More complex data modulation techniques, commonly used in telecommunications, use more than two symbol states so that each symbol is represented by more than one bit. Hence, the baud rate typically has a smaller value than the bit rate, but more accurately indicates the data transmission capability of a system or a device such as an electro-optic modulator.

Recently, the desired specification for high speed modulators has rapidly increased from about 10 GBd per optical wavelength or channel to 50 GBd per optical wavelength or above. A common goal in the industry is now 100 GBd per wavelength.

Current commercially available devices claim operating speeds of 100 Gb/s per optical wavelength, while some researchers have claimed throughput in excess of 400 Gb/s or 600 Gb/s at a single wavelength. However, these results all rely on complex modulation formats (such as PAM-N (pulse amplitude modulation), QAM-N (quadrature amplitude modulation) and DMT (discrete multitone)) and are associated with complex digital signal processing techniques. In reality, the actual baud rate is much lower, and tends to be limited by the electrical-to-optical bandwidth supported by the various electrical and optical devices comprised in a system.

Provision of equipment in this area is largely split into two markets: electrical devices and optical devices. Electrical devices include broadband amplifiers that can work from 100 kHz to 67 GHz supporting signal amplification at 100 GBd. However, these devices are designed and packaged separately from any optical devices with which they may be required to operate, are extremely expensive and consume a lot of power. Also, achievable operation speeds offered by these amplifiers have ceased to increase for many years, suggesting that the performance barrier has been reached and further improvement is unlikely.

A recent optical device [1] comprises a lithium niobate modulator operating up to 100 Gb/s with on-off keying (OOK) modulation, 140 Gb/s with PAM-4 and 210 Gb/s with PAM-8), corresponding to 70 GBd. An alternative modulator device [2] based on a silicon photonics platform has demonstrated 90 Gb/s OOK (128 Gb/s PAM-4) or 56 GBd. However, these devices depend on dedicated fabrication processes, and concentrate on enhancement of optical device performance in isolation, with no consideration given to reliable integration of the optics devices with electronic devices. Also, performance of the devices is limited by RF (radio frequency) loss at phase-shifting electrodes in the modulators. An alternative electro-optical modulator is described in US 2017/0075187 [8].

Accordingly, devices capable of high-speed performance in the context of operational integration between electronic and optical elements of a telecommunications or other modulation system are of significant interest.

SUMMARY OF THE INVENTION

Aspects and embodiments of the invention are set out in the appended claims.

According to a first aspect of certain embodiments described herein, there is provided an optical modulation system comprising: a signal source configured to generate an amplitude modulated electrical signal having a bandwidth and divided into frequency components comprising at least a first frequency component covering a first portion of the bandwidth and a second frequency component covering a second portion of the bandwidth; and an electro-optic modulator for receiving an input optical signal, the modulator having a first optical path and a second optical path, the input optical signal being divided between the first optical path and the second optical path and recombined after propagation along the first optical path and the second optical path to produce an output optical signal, and at least one of the first optical path and the second optical path comprising a phase shifter comprising a pair of electrodes in which each electrode is configured to receive a driving signal; wherein the or each phase shifter is coupled to the signal source to receive at least one of said frequency components as a driving signal for an electrode, and the phase shifters are arranged such that the or each phase shifter receives a different pair of driving signals.

According to a second aspect of certain embodiments described herein, there is provided a method of modulating an optical signal, comprising: generating an amplitude modulated electrical signal having a bandwidth and divided into frequency components comprising at least a first frequency component covering a first portion of the bandwidth and a second frequency component covering a second portion of the bandwidth; passing an input optical signal into an electro-optic modulator having a first optical path and a second optical path arranged such that the input optical signal is divided between the first optical path and the second optical path and recombined after propagation along the first optical path and the second optical path to produce an output optical signal, wherein at least one of the first optical path and the second optical path comprises a phase shifter comprising a pair of electrodes in which each electrode is configured to receive a driving signal; and supplying each electrode in the or each phase shifter with a driving signal such that the or each phase shifter receives at least one of said frequency components as a driving signal, and the or each phase shifter receives a different pair of driving signals so as to produce a phase difference between the optical signal after propagation along the first optical path and the optical signal after propagation along the second optical path.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, methods or systems for electro-optic modulation may be provided in accordance with approaches described herein which include any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
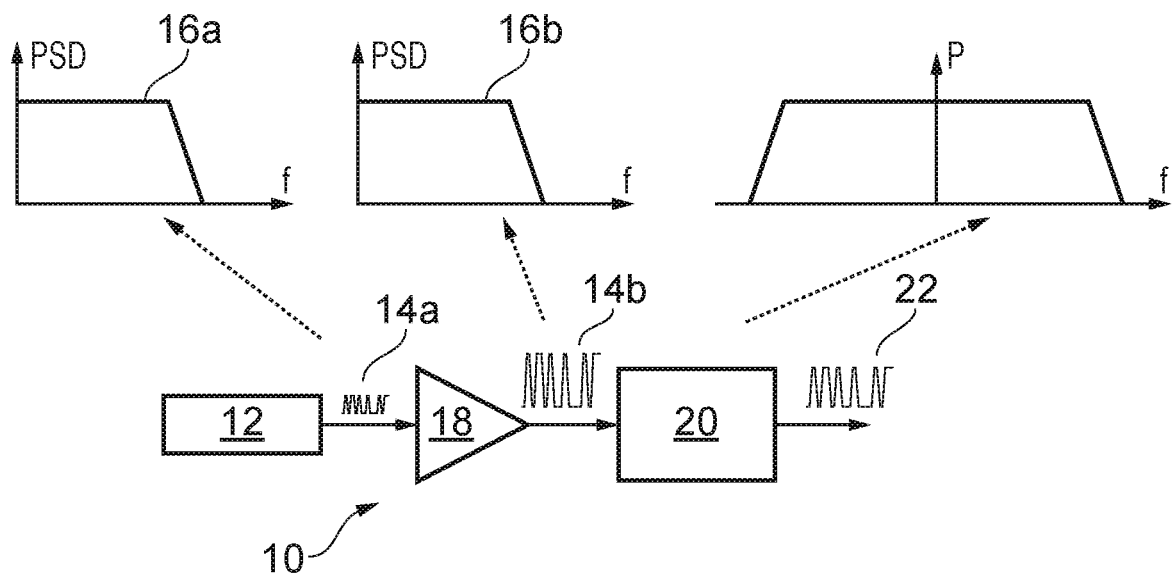
FIG. 1 shows a schematic view of a conventional optical modulation system.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present invention proposes to use a frequency slicing approach to enable very high data rates in conjunction with effective integration of electronic and optical elements of a system for optical modulation. As explained in more detail below, the frequency slicing allows optimisation of the design of the various elements for both individual performance and cooperation with the other elements, leading to increased operating speeds, while the elements themselves can retain a simple format that allows compact integration into small modulator systems, with all elements fabricated on a single substrate such as a silicon wafer to give a low power consumption millimetre scale device, for example.

Frequency slicing, sometimes alternatively referred to as spectral slicing, is a technique by which a signal with a broad frequency bandwidth (broadband signal, a signal including a broad range of frequencies) or otherwise including multiple frequencies, is divided or sliced into smaller frequency components each covering a narrower band of frequencies. The components are used, processed, manipulated or otherwise handled individually before being recombined to construct the original broadband spectrum again. The concept itself is known, but in the context of optical devices and electrical devices for signal modulation, has only been implemented in either the electrical domain or the optical domain. Electro-optic modulation requires the generation of an electrical signal, which is often passed through one or more amplifiers, and which is used to drive electrodes in a modulator that cause a phase shift in a propagating optical signal, and resultant phase difference with another propagating optical signal. An amplitude modulation of the electrical signal representing or encoding data is translated into an amplitude or phase modulation of the optical signal, resulting from merging the phase differing optical signals. The modulated optical signal can then be propagated in an optical fibre network as a telecommunications signal carrying the data, or used for other purposes. Hence, there are components operating in both electrical and optical regimes to produce the required signal.

The electrical drive signal applied to the modulator electrodes is an analog signal, so some arrangements utilise digital-to-analog conversion in the generation of the electrical signal. One digital-to-analog conversion arrangement that makes use of frequency slicing [3] includes multiple digital-to-analog converters (DAC). A wide band digital signal is split into multiple narrowband signals each of which undergoes conversion in a dedicated narrow bandwidth DAC. The narrowband analog signals from the DACs are up-converted and combined in the electrical domain to form a wide-band signal, using a specially designed triplexer. This can then be used to drive a modulator. However, the discrete DACs consume a lot of power, and the triplexer is large and costly to build. Overall, the device is not compatible for compact integration or packaging with an electro-optic modulator.

The application of frequency slicing in the optical domain tends to be based on optical frequency combs [4]. Generally, optical combs generate multiple optical wavelengths and electro-optic modulation is applied to each individual wavelength. This approach can be useful for long-haul coherent optical communication systems, but is too complex to be realised for short-reach communication systems.

The present invention proposes frequency slicing that does not utilise optical combs, allows the sliced frequency components to be carried seamlessly from the electrical domain to the optical domain, and performs the recombination of the frequency components within the modulation procedure so that dedicated frequency combining elements are not required. Frequency slicing, both the dividing and the recombining, is carried out within the procedure of electro-optic modulation.

FIG. 1 shows a highly schematic representation of an example conventional electro-optic modulation system, operable to translate high speed electronic signals into the optical domain, and commonly used in modern telecommunications networks and microwave-photonic systems. The system 10 comprises a signal generator 12 that generates an amplitude modulated electrical signal 14a, where the pattern of modulation encodes data to be communicated according to any of many known modulation schemes. The modulation is of the amplitude of the electrical voltage. Also, the electrical signal 14a has a power spectral density (PSD), or frequency envelope 16a with a broad bandwidth such that the power is distributed roughly equally across all frequencies f within the bandwidth. The signal 14a is input into an electrical amplifier 18 which amplifies the signal 14a to output a driving signal or driver signal 14b. The driving signal 14b preserves the pattern of amplitude modulation from the signal 14a and has a PSD envelope 16b of the same shape as the unamplified envelope 16a. However, the power or strength of the driver signal 14b is increased over the input signal 14a by the amplification process in the amplifier 18.

The driver signal 14b is applied to one or more electrodes comprised in one or more phase shifting elements or phase shifters in an electro-optic modulator 20. An optical signal lacking amplitude modulation is input to the electro-optic modulator 20 where it passes through the phase shifters. By a process described further below, the amplitude modulation of the driver signal is imprinted onto the optical signal, so the electro-optic modulator outputs an amplitude modulated optical signal 22 which encodes the same data as the original electrical signal 14a. The optical signal 22 is a broadband optical signal with a power envelope P covering a wide frequency range f, where the wide range is made up of many individual frequency channels each carrying data. The optical signal 22 can then be delivered into an optical fibre network for telecommunications transmission, for example.

In order to obtain amplitude modulation of the optical signal, the electro-optic modulator comprises two optical arms or pathways (typically waveguides formed in a substrate by a refractive index variation in the substrate material) between a single optical input port from which incoming light is split between the two pathways, and a single optical output port where the light from the two pathways is collected and combined. The two pathways form a Mach-Zehnder interferometer, so the modulator can be termed a Mach-Zehnder modulator (MZM). One or both of the optical pathways is provided with a electrically driven phase shifting element (phase shifter or phase modulator), comprising a pair of electrodes disposed on either side of the optical pathway. The purpose of the phase shifter is to induce a phase difference between light propagating in the two pathways. The application of electrical power to the electrodes causes a change in refractive index of the material forming the waveguide pathway so that the phase of the propagating light is also changed. If the phase change is induced in only one pathway, or if different phase changes are induced in the two pathways (by application of different driver signals to the electrodes), the light from one pathway has a phase difference compared to the light from the other pathway. When the light from the two pathways is combined, the phase difference produces an amplitude modulation in the output optical signal according to constructive or destructive interference, which matches the modulation of the driver signal.

The refractive index change can be electrically-induced in various ways. For example, the waveguides may be formed in a semiconductor material, with a p-doped region as one electrode of the phase shifter and a n-doped region as the other electrode. The application of different driving signals to the two electrodes produces a voltage difference across the waveguide, causing the migration of charge carriers and a resultant change in the charge distribution, which modifies the refractive index. The semiconductor material may be silicon, or group III/group V materials, for example. Alternatively, a nonlinear optical material can be used, in which the application of a driver voltage produces a refractive index change via non-linear optical effects, such as the Kerr effect. Conventionally, lithium niobate is widely used in electro-optic modulators for many applications including telecommunications.

Examples of the present invention are applicable to electro-optic modulators fabricated from these and similar materials.

The present invention proposes that the original amplitude modulated electrical signal be frequency sliced into two or more frequency components each with a smaller frequency bandwidth than the frequency bandwidth of the original signal, to form driver signals for an electro-optic modulator. The driver signals may undergo amplification, as described with regard to FIG. 1. If the slicing is implemented prior to amplification, each frequency component can be amplified by a dedicated narrowband amplifier optimised for the relevant narrow frequency range of the relevant frequency component. Alternatively, the slicing may be performed after amplification, but this approach does not utilise the design benefit of using narrowband amplifiers. Each driver signal is applied to at least one phase shifter electrode in the modulator, so that all components of the original electrical signal are represented in the modulation. The phase shifters on the two optical pathways are driven with different pairs of driver signals (derived from positive and negative versions of the driver signals, or by pairing a positive or a negative driver signal with a DC bias, for example) to ensure that a phase difference is produced between the pathways.

Figure 2A:
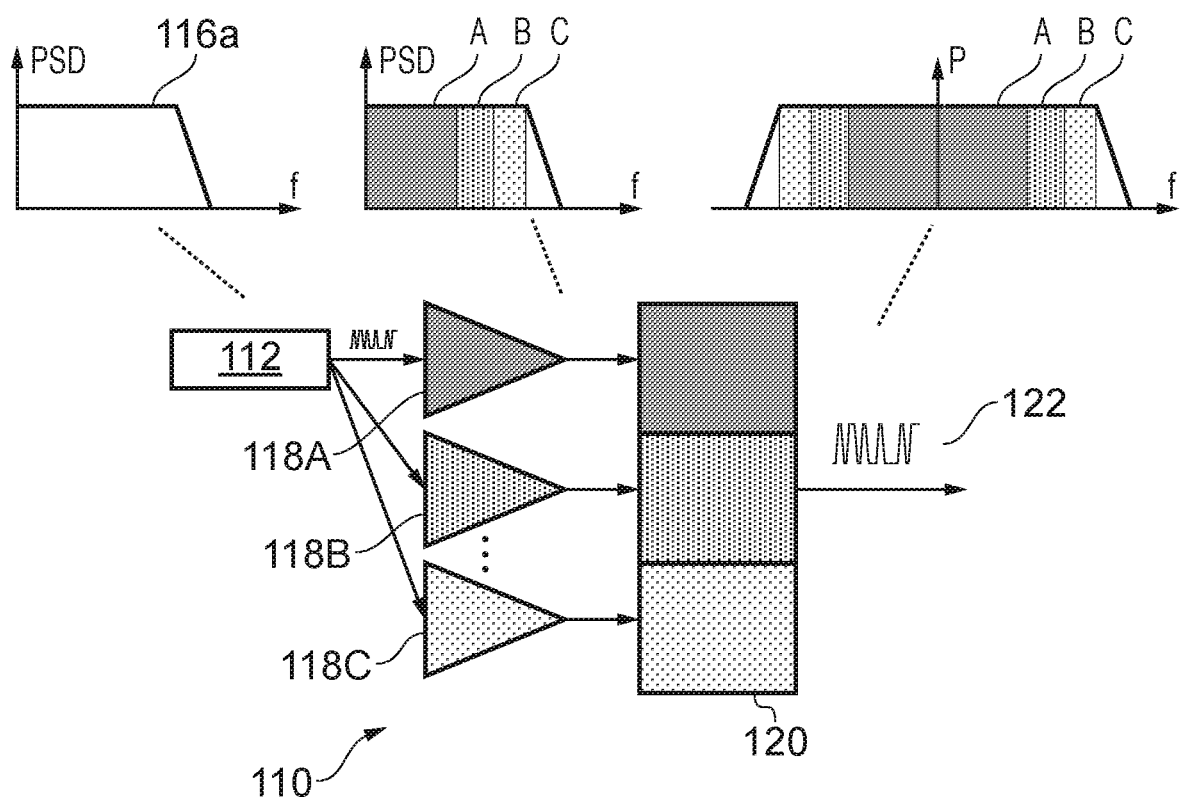
FIG. 2A shows a highly schematised representation of an optical modulation system using frequency slicing according to an embodiment.

FIG. 2A shows a highly schematic representation of an example electro-optic modulation system configured with frequency slicing to illustrate an example of the concept in general terms. The system 110 comprises a signal generator 112 which is configured to generate an amplitude modulated electrical signal as in FIG. 1, covering a broad bandwidth in a PSD envelope 116a as before. Additionally, however, the signal source divides or slices the broad bandwidth signal into at least two frequency components each covering a portion of the frequency within the original bandwidth. In this example, the original bandwidth is sliced into three components, represented by different shading. A first frequency component A occupies a portion of the bandwidth which is about half the full extent, from the DC level. A second component B and a third component C are narrower, each covering about a quarter of the original bandwidth. The second frequency component B lies between the first component A and the third component C. In this example, the frequency components are consecutive; no frequencies are left uncovered by the slicing.

These three frequency components are output from the signal generator 112, and each is passed to a dedicated amplifier 118 configured for the specific bandwidth of each component. These may be narrowband amplifiers. By "narrowband" it is meant that the amplifier is designed to handle signals covering a frequency range which is smaller or narrower than the frequency range of the original broadband electrical signal. Moreover, each amplifier is configured and optimised for operation over the frequency range of its corresponding frequency component, in order to produce the most efficient amplification. Hence a first amplifier 118A receives the first frequency component A, a second amplifier 118B receives the second frequency component B, and a third amplifier 118C receives the third frequency component C. Narrowband amplifiers can provide improved amplification performance across the relevant bandwidth compared to broadband amplifiers, so by slicing the electrical signal into narrower frequency components and tuning or optimising an amplifier for each component, an enhanced amplification can be achieved compared to the broadband amplification in the FIG. 1 system.

Then, each frequency component A, B, C is used as a driving signal for at least one electrode of a phase shifter in an electro-optic modulator 120 (shown highly schematically in FIG. 2). The frequency components A, B, C may be used in positive form, in negative form, or in both positive and negative forms within a single modulator 120. Positive and negative signals may be handled by different amplifiers (as shown in some later examples) or might be generated one from another after amplification. Either positive or negative forms may also be combined with a DC bias so that an electrode pair in a single phase shifter receives a frequency component to drive one electrode and a DC bias at the other electrode. Various examples of these arrangements are described in more detail below. The optical signals from the two pathways through the modulator 120 are combined in the conventional manner to produce an amplitude modulated optical output signal 122 which includes all the frequency components A, B, C transplanted to the optical domain, so as to provide an amplitude modulated broadband optical output.

Figure 2B:
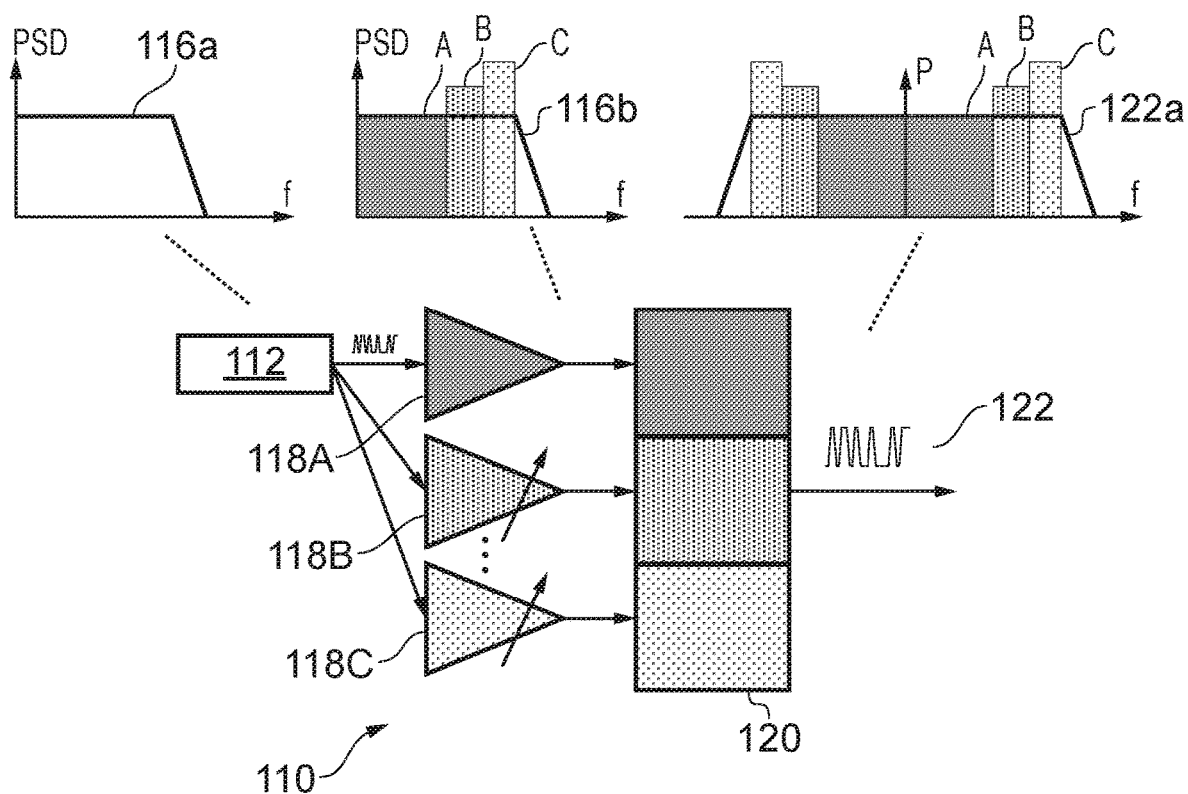
FIG. 2B shows a highly schematised representation of an optical modulation system using frequency slicing according to an embodiment that offers optical signal shaping.

FIG. 2B shows a highly schematic representation of a further example electro-optic modulation system. The majority of the system is the same as that of the FIG. 2A example. However, the systems differ in that, where the FIG. 2A system utilises regular amplifiers configured to amplify the various frequency components to the same level, the FIG. 2B system replaces the amplifiers 118B and 118C, which handle the narrow frequency components B and C, with variable gain amplifiers. Hence, a different amount of amplification can be applied to each frequency component, and the amplification level can be modified or adjusted at will according to requirements. In the depicted example, the amplifier 118B handling the central frequency component B is set to amplify to a higher level than the amplifier 118A handling the broader frequency component A, and the amplifier 118C handling the highest frequency component C is set to amplify to a higher level than the amplifier 118B. Accordingly, the power spectrum acquires a shaped (stepped) power distribution 116b, with each frequency component having a different power level. When the frequency components are applied to drive the optical modulator 120, the resulting optical output signal 122 has the same shaped power spectrum 122a. Depending on the complexity of shaping required, any number of amplifiers in a system can be configured as variable gain amplifiers, from just one amplifier to all amplifiers. Also, the functionality may be provided by a combination of a regular amplifier and a module or unit configured to provide a separate gain control function. Practically, however, the variable gain is most usefully applied to the narrow band frequency components.

This arrangement therefore enables optical signal shaping, where the power of the modulated optical output signal can be shaped with respect to frequency. This can be used to implement approaches such as optical Nyquist pulse shaping or pre-emphasis. The gain of each amplifier, in particular those amplifiers which are narrow band components handling narrow band frequency components, can be varied to provide individual and different amplification of each frequency component. This is in addition to the enhanced system bandwidth offered by the simpler system of FIG. 2A.

This functionality to provide optical signal shaping can be used to replace conventional techniques which rely on electrical digital signal processing to shape the frequency spectrum, followed by digital to analog conversion to obtain the required analog voltage signals to drive the optical modulator. These elements increase power consumption and system cost. Furthermore, the digital signal processing time introduces unavoidable latency into any communication link using such a system. This is particularly undesirable in the context of the high performance levels demanded from modern communication systems such as 5G. The alternative approach offered by a system such as the FIG. 2B example removes these obstacles so has the potential to offer significant improvements to optical communication systems.

Figure 2C:
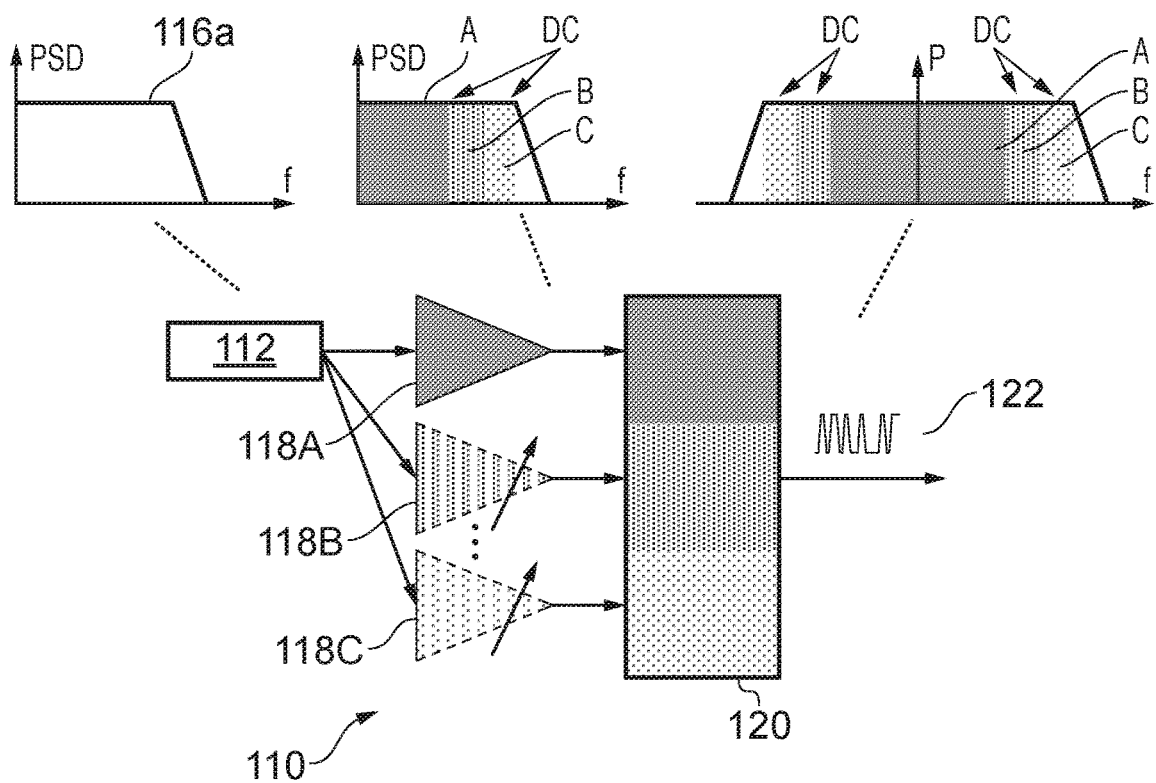
FIG. 2C shows a highly schematised representation of an optical modulation system using frequency slicing according to an embodiment that offers chromatic dispersion compensation.

FIG. 2C shows a highly schematic representation of a further example electro-optic modulation system. The majority of the system is the same as that of the FIG. 2A example, However, the systems differ in that, where the FIG. 2A system utilises regular amplifiers configured to amplify the various frequency components in the same way across the full frequency range of the electrical signal, the FIG. 2C system replaces the amplifiers 118B and 118C, which handle the narrow frequency components B and C, with variable time delay amplifiers. These allow the group delay of the respective frequency components to be finely controlled, for example on the scale of around 10 ps, before they are applied to the optical modulator 120. In the depicted example, the amplifier 118B handling the central frequency component B and the amplifier 118C handling the highest frequency component C are configured as variable time delay amplifiers, and allow a different group delay to be introduced into each frequency component. This allows for dispersion compensation (DC) of these components which translates across to the optical signal 122 output from the modulator 120, providing pre-compensation of chromatic dispersion within an optical communication link fed by the modulation system. Dispersion occurs because different light frequencies typically travel at different speeds along optical fibre, so that an optical signal becomes distorted by the time it reaches the end of the optical fibre. Adjusting the group delay in advance in the opposite direction to the dispersion allows this effect to be pre-compensated, so that the optical signal can arrive without chirp. As in the FIG. 2B example, such pre-compensation is conventionally achieved using digital signal processing and digital to analog conversion, so the proposed approach of FIG. 2C using variable time delay amplification is again beneficial in offering a way to avoid the drawbacks of the conventional technique.

Depending on the complexity of chromatic dispersion pre-compensation required, any number of amplifiers in a system can be configured as variable time delay amplifiers, from just one amplifier to all amplifiers. Also, the functionality may be provided by a combination of a regular amplifier and a module or unit configured to provide a time delay function. Practically, however, the variable time delay is most usefully applied to the narrow band frequency components.

The example systems of FIGS. 2A, 2B and 2C differ by their implementation of the amplification aspect. Any of these arrangements (or no amplification at all) may be used in conjunction with any of the various example systems described below.

While the FIGS. 2A, 2B and 2C examples shows the bandwidth of the original electrical signal sliced into three consecutive, adjacent portions to give three frequency components, the invention is not limited in this regard. Useful results can be obtained by slicing into just two frequency components. On the other hand, if additional phase shafting segments are provided along the optical pathways of the modulator, so as to increase the number of electrodes to be driven, larger numbers of frequency components (four or more) can be generated from slicing or dividing the electrical signal, and used to drive at least one electrode each. Also, the electrical signal may be sliced and passed to the modulator such that the frequency components cover only part of the original bandwidth, either as adjacent or non-adjacent portions of the original bandwidth. In this way, parts of the bandwidth not required to be in the optical signal can be eliminated before modulation.

As a practical example, consider the modulation technique of on-off keying (OOK) which is a simple form of amplitude-shift keying modulation.

Figure 3:
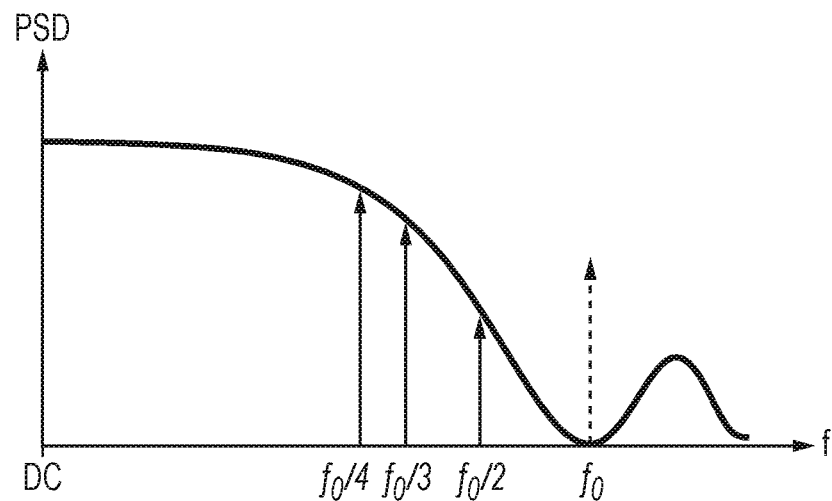
FIG. 3 shows a graph of the power spectral distribution of a typical signal used for on-off keying (OOK) amplitude modulation.

FIG. 3 shows the power spectrum or power spectral density (PSD) of a standard OOK signal. We can define a symbol period $T_0$, being the time spacing between consecutive symbols in the modulated signal. The corresponding frequency $f_0$ to achieve this symbol period $T_0$ is given by $f_0 = 1/T_0$ (correspondingly, $T_0 = 1/f_0$). Recalling that the baud rate is the number of symbol changes per second, one can calculate the required values of $T_0$ and $f_0$ to achieve a required baud rate, for example the desirable 100 GBd discussed above, and define the PSD accordingly. The PSD of the OOK signal has a frequency bandwidth from DC to $f_0$, as shown in FIG. 3.

Figure 4:
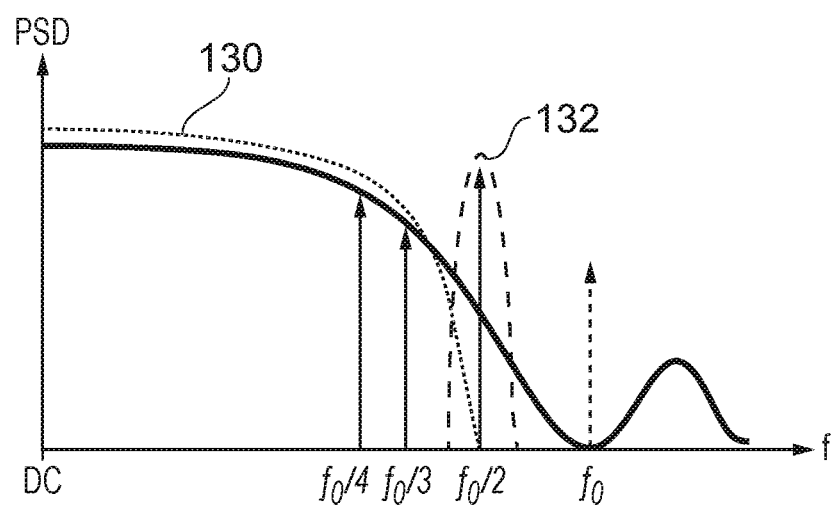
FIG. 4 shows the graph of FIG. 3 with the power spectral distribution divided into two frequency components suitable for use in methods and systems according to some embodiments.

To implement OOK modulation with conventional devices, it is necessary for both electronic devices and optical devices in the modulation system to be configured to handle all frequency components across the DC to $f_0$ bandwidth, which is a broad range. With known arrangements, however, the operating speed of the electro-optic modulator can be limited by RF losses at the electrodes when they handle a broad frequency range, and also by the capacitance of the semiconductor junction across the phase shifter (for semiconductor-based modulators). Considering the electrical signal source producing the driving signals (which we may refer to as the modulator driver or drivers), power consumption and variation of group delay are the main factors that limit the achievable bandwidth of broadband amplifiers. RF electrode losses can be managed better for narrower bandwidth, and a reduced bandwidth is more achievable for the electrical amplification. Accordingly, the frequency slicing approach presented herein, whereby the various elements need only handle narrow bandwidths, enables better modulator performance. Rather than attempting to design either or both of the modulator and the modulator driver or drivers as ultrawide-wide band devices, which is difficult to achieve, both these parts can be built as two or more submodules each handling different, narrower, frequency components in a more effective manner FIG. 4 shows the standard OOK signal of FIG. 3 sliced into two frequency components for modulation according to an example of the present invention. A first frequency component 130 is relatively broadband, in that it covers, at a roughly constant PSD level, the portion of the OOK signal frequency range extending from DC to around one-third of the symbol period frequency $f_0$, or $f_0/3$. Beyond $f_0/3$, the frequency component declines rapidly to zero at about $f_0/2$. This is shown by the dotted line in FIG. 4. A second frequency component 132 is narrowband, in that it covers a narrower or significantly narrower portion of the bandwidth than the broader first component 130, and is centred on or near to a frequency about one half of the symbol period frequency $f_0$, or $f_0/2$. The narrow bandwidth is nevertheless sufficient to overlap with the high frequency tail of the first frequency component 130, so that the frequency range is covered adequately without gaps.

Figure 5:
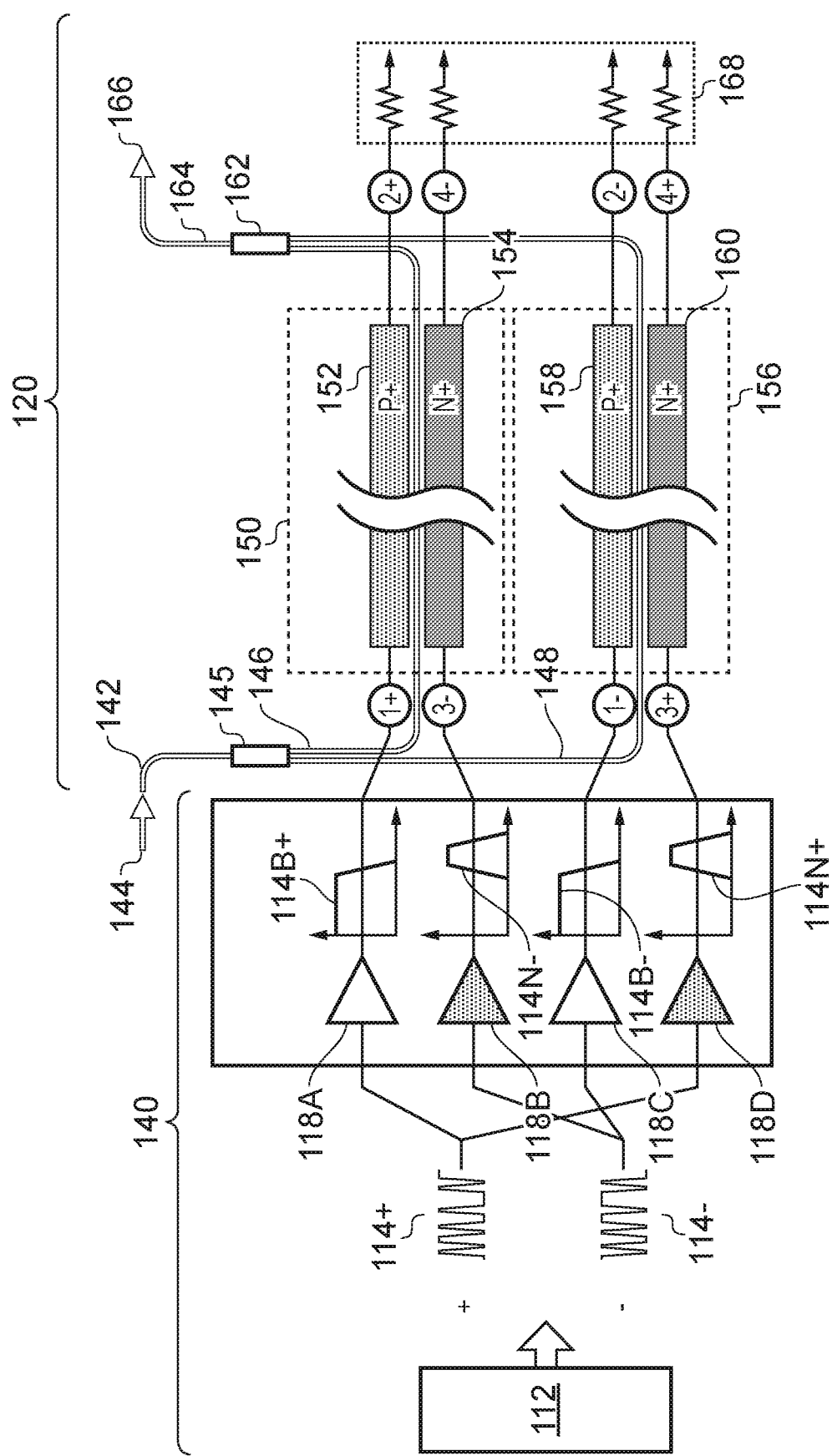
FIG. 5 shows a schematic representation of an optical modulation system according to an embodiment using two frequency components, plus voltage plots of electrical signals of each frequency component used to drive a modulator of the system.
Figure 5:
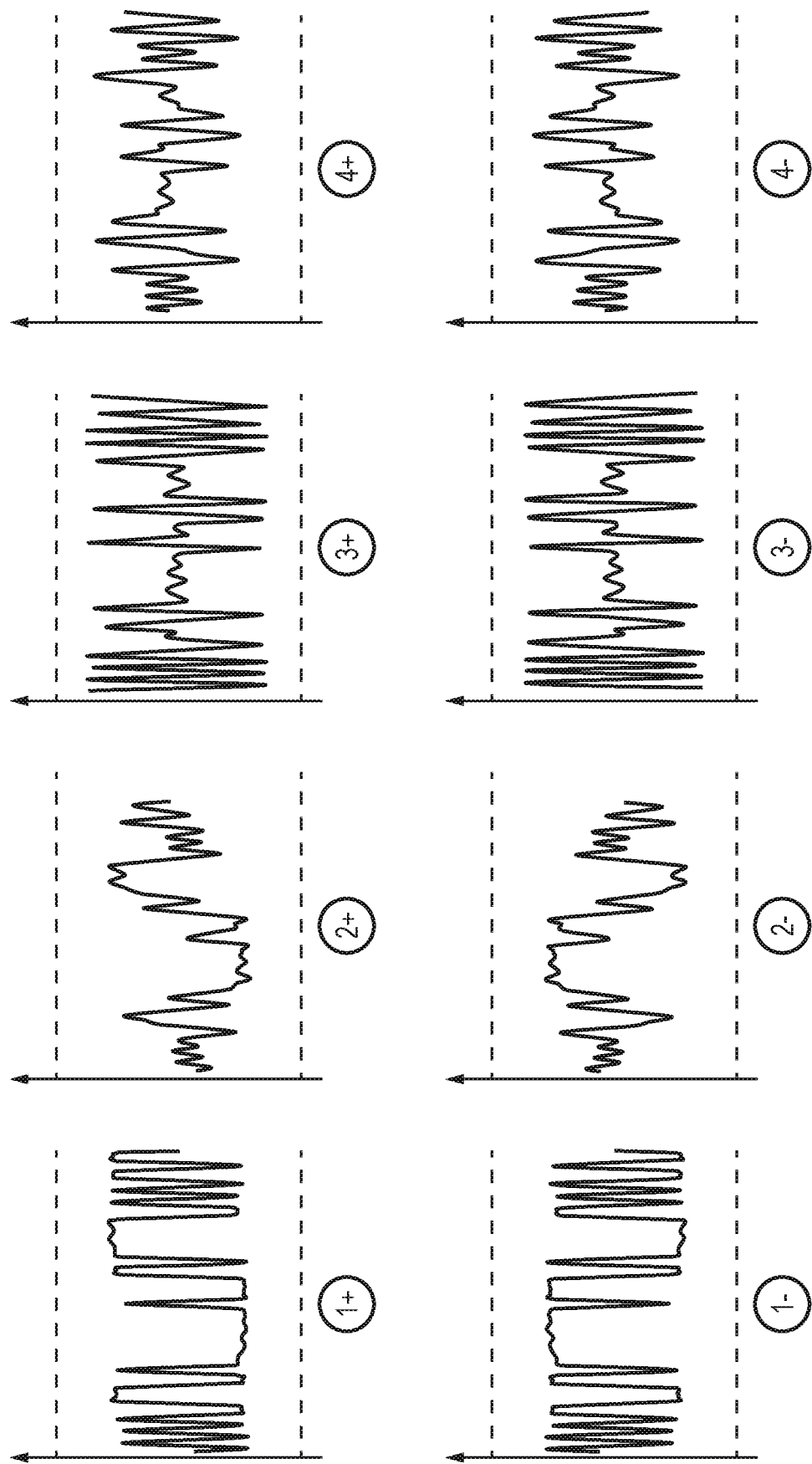

FIG. 5 shows a schematic representation of an example optical modulation system configured to operate with two frequency components, such as the components of FIG. 4. A signal source 140 comprises a signal generator 112 and amplifiers 118. The signal generator 112 generates an amplitude modulated electrical signal, where the modulation may be achieved by an OOK modulation scheme, or by other convenient modulation schemes, such as PAM-N. The invention is not limited in this regard, and can be advantageously used to increase the baud rate regardless of the modulation scheme. The amplitude modulated electrical signal, having a bandwidth, is output in both positive and negative formats or versions (in which the direction of the modulation of the voltage is reversed), 114+ and 114−. Also, it is sliced or divided into two frequency components each covering a different portion of the bandwidth. These portions may be the broader portion and the narrower portion described with regard to the sliced OOK signal of FIG. 4, but other dividing regimes may be used if preferred. For the sake of illustration, we consider the broader first frequency component and narrower second frequency component of FIG. 4 in this example. Each frequency component is provided as a positive and a negative version, giving a positive first (broad) component 114B+, a positive second (narrow) component 114N+, a negative first (broad) component 114B−, and a negative second (narrow) component 114N−. Each of these frequency components is passed to its own dedicated amplifier 118, configured for operation across the bandwidth of the particular component. Thus, the first positive component 114B+ is passed through a first amplifier 118A, the second negative component 114N− is passed through a second amplifier 118B, the first negative component 114B− is passed through a third amplifier 118C and the second positive component 114N+ is passed through a fourth amplifier 118D. The amplifiers output amplified versions of these frequency component signals, to provide modulator driving signals. Hence, there is a driving signal comprising each of the frequency components into which the original amplitude modulated electrical signal is sliced, which in this example are additionally generated in both positive and negative versions.

The optical modulation system further comprises an electro-optic modulator 120. A substrate (not shown) has formed within it, in a conventional manner, waveguides defining a modulator arrangement such as a Mach-Zehnder modulator. An optical input waveguide 142 receives an optical input signal 144 which is to be amplitude-modulated. The input waveguide 142 comprises an optical splitter 145, such as a multimode interference (MMI) coupler which divides the waveguide 142 into two waveguides or pathways through the modulator 120, a first pathway 146 and a second pathway 148, each of which receives substantially half of the incoming optical signal 144. The first pathway 146 has an associated first optical phase shifter 150, comprising a pair of electrodes, namely a first electrode 152 and a second electrode 154 arranged oppositely across the first pathway 146 for the purpose of shifting the phase of light propagating in the first pathway 150, as described above. In this example, the modulator material is a semiconductor, such as silicon, and the first electrode 152 comprises a p+ doped region and the second electrode 154 comprises a n+ doped region. The second pathway 148 has an associated second optical phase shifter 156 comprising a similar electrode pair comprising a first p+ doped electrode 158 and a second n+ doped electrode 160. After exiting the phase shifters 150, 156, the first pathway 146 and the second pathway 148 come together at a second MMI coupler 162 or similar device that combines light from the two pathways 146, 148 and passes the combined light to an output waveguide 164 which delivers the light as an optical output signal 166, carrying the original amplitude modulation of the electrical signal 114 from the signal generator 112.

The modulation is achieved by supplying the driving signals from the amplifiers 118A-118D to the different electrodes of the modulator phase shifters 150, 156 to induce a phase difference and resultant amplitude modulation of the optical signal, as described above. Generally, each frequency component (as either a positive version, a negative version, or both) derived from the original electrical signal is supplied to at least one electrode in at least one of the phase shifters, and the electrode pair in each phase shifter receives a different combination of driving signals from the other electrode pair. In this way, all (in this example, two) frequency components are input to the optical modulation process, and a different phase change is induced in the first pathway compared to the second pathway to give a phase difference when the light is recombined, where the phase difference carries information from all the frequency components. In this way, the full frequency bandwidth of the original electrical signal is mapped to the optical signal, in addition to transferring of the amplitude modulation.

In the present example, the first electrode 152 of the first phase shifter 150 is driven by the positive first frequency component 114B+, represented in FIG. 5 as an electrode input of 1+. The second electrode 154 of the first phase shifter 150 is driven by the negative second frequency component 114N−, represented as an electrode input of 3−. The first electrode 158 of the second phase shifter 156 is driven by the negative first frequency component 114B−, represented as an electrode input of 1−. The second electrode 160 of the second phase shifter 160 is driven by the positive second frequency component 114N+, represented as an electrode input of 3+. The electrodes 152, 154, 158, 160 are terminated to earth with a conventional termination module 168 at their far ends, corresponding to the optical output end of the phase shifters 150, 156. The electrical signals at the termination end of the electrodes are an attenuated version of the inputted driving signals, such that the input 1+ gives an attenuated output 2+, the input 3− gives an attenuated output 4−, the input 1− gives an attenuated output 2− and the input 3+ gives an attenuated output 4+.

It is possible for all the electronic devices or components and all the optical (photonic) devices or components shown in FIG. 5 to be monolithically fabricated onto a single substrate, formed for example from silicon. Alternatively, the amplifiers 118A-118D (modulator drivers) and the termination module 168 (comprising a termination for each phase shifter electrode) can be fabricated separately and then bonded onto a silicon substrate in which the modulator 120 has already been fabricated. Bonding may be by any suitable technique, such as flip-chip bonding, wire bonding and monolithic integration. In either case, it is possible to manufacture a simple, compact and inexpensive optical modulation system in which individual components can be tailored for optimum performance at particular frequency bandwidths over which they are intended to operate.

The system of FIG. 5 can be modified to utilise other modulation schemes. For example, the DMT (discrete multitone) scheme applies a different modulation to different frequencies. Accordingly, the signal generator 112 can be configured to generate the various frequency components of the amplitude modulated electrical signal to have different modulation patterns. This is also applicable to the other example systems described herein.

To demonstrate the quality of performance that can be obtained using the frequency slicing approach described herein, a simulation has been carried out based on a system as shown in FIG. 5. The results of the simulation are shown in FIG. 5 and in FIG. 6.

In the simulation, the amplifiers 118A-118D had a broadband frequency response target and a narrowband frequency response target for a 100 Gb/s OOK signal sliced into two frequency components as shown in FIG. 4. A radio frequency loss profile representing attenuation of the electrical driving signals in the electrodes measured from a recently fabricated 1.8 mm length silicon MZM was input into the simulation.

The lower part of FIG. 5 shows the positive and negative broadband (first frequency component) electrical driving signals 1+ and 1−, and the positive and negative narrowband (second frequency component) electrical driving signals 3+ and 3− supplied to the electrodes. Also shown are the electrical signals at the termination side of the electrodes, correspondingly being the electrical signals 2+, 2−, 4+ and 4−. Significant attenuation owing to RF losses in the modulator can be observed (the reduced amplitude of the signals compared to the original driving signals), although the pattern of the modulation is preserved.

Figure 6:
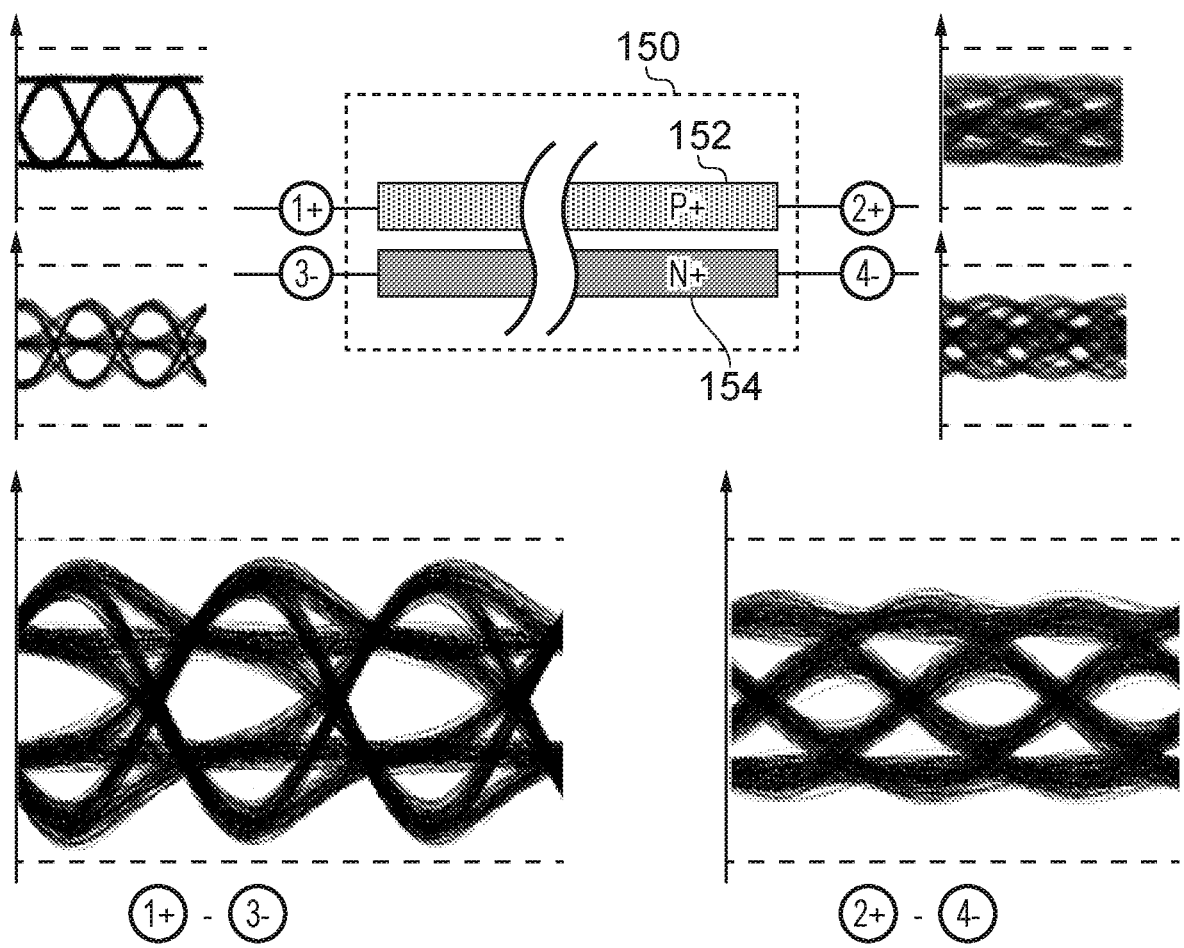
FIG. 6 shows eye diagrams of the electrical signals shown in FIG. 5 and eye diagrams of the voltage difference between the electrical signals at an input end and an output end of the modulator electrodes.

FIG. 6 shows eye diagrams for each of the signals 1+, 2+, 3− and 4−, for the first phase shifter 150. Of interest for the required modulation of the optical signal is the voltage difference across the phase shifter, that is, between the first and second electrodes 152, 154 (voltage difference between the p+ and n+ doped regions, in this example). The voltage difference at the optical input end of the phase shifter 150 is given by (1+)-(3−), and is shown in the lower left eye diagram in FIG. 6. The significant clear eye-open regions can be observed. For high quality high speed modulation of the optical signals, the voltage difference should also be present at the optical output end of the phase shifter (where the driving signals are terminated), having been preserved along the optical propagation length of the electrodes. At the optical output end, the voltage difference is (2+)-(4−), which is shown in the lower right eye diagram in FIG. 6. Despite the reduction in signal strength from the RF attenuation which is evident from the signals depicted in FIG. 5, a clear eye-open region is still achieved at the termination end. Hence, the simulation of frequency slicing of a 100 Gb/s OOK signal shows that the electrical driving signals have a good quality and performance even at the high bit rate.

The FIG. 5 example system comprises a termination module 168 in which the four electrodes of the two phase shifters are terminated to earth in a conventional manner. However, since the frequency slicing concept enables individual components of a modulator system to be tailored for optimised performance and operation at a particular frequency or frequency range, in other examples it is proposed that the electrode termination can be optimised.

Figure 7:
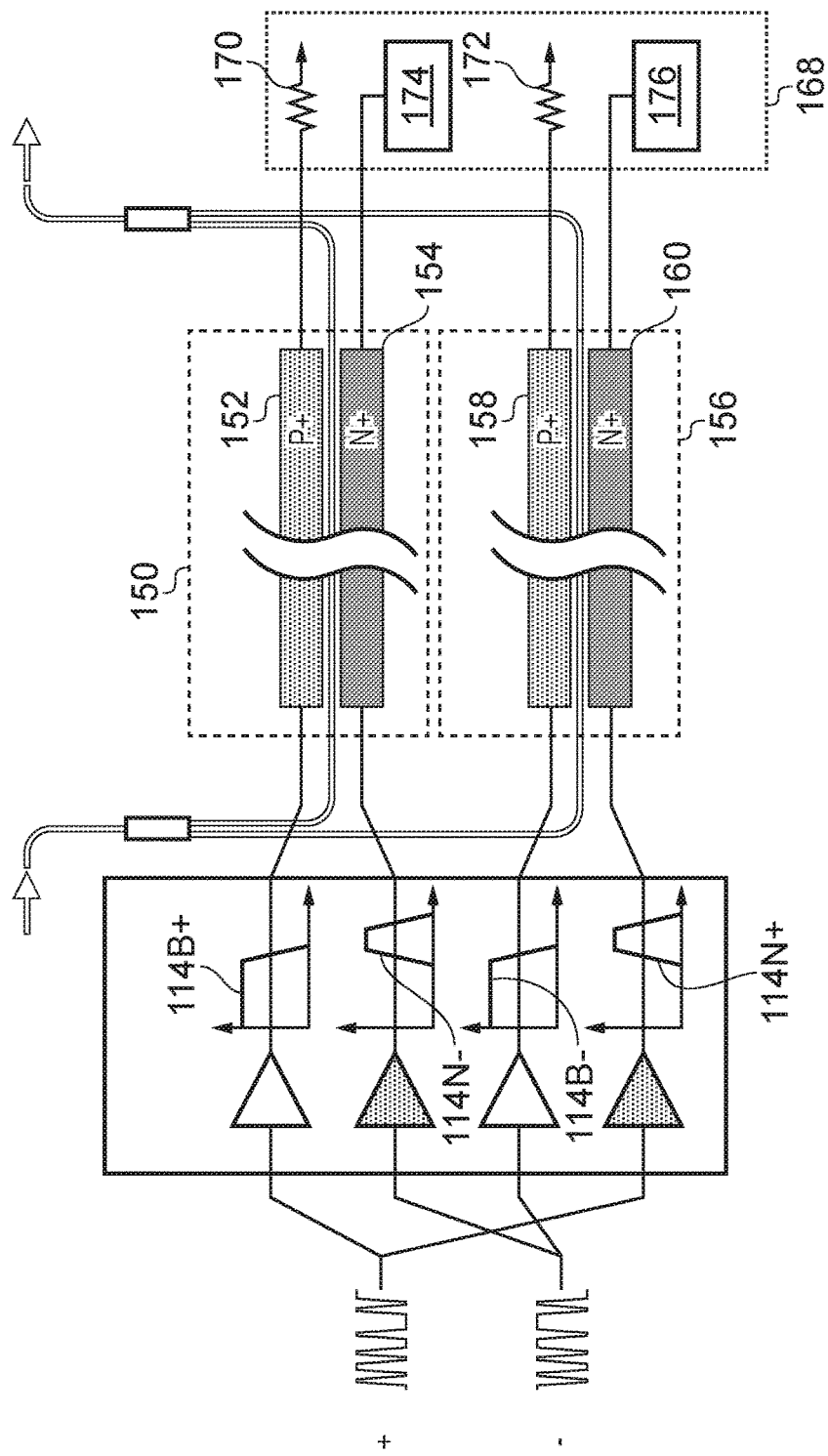
FIG. 7 shows a schematic representation of an optical modulation system according to a second embodiment using two frequency components.

FIG. 7 shows a schematic representation of an example modulation system with the same components (not described further here; please refer to the description of FIG. 5) as the example of FIG. 5, except for a different design of termination. The first electrodes 152, 158 of the two phase shifters 150, 156 are driven by the first frequency component 114B+, 114B−, which has the broader frequency range of the two sliced frequency components. Accordingly, the termination module 168 comprises earth terminations 170, 172 for each of these electrodes, suitable for a wide range of frequencies. The second electrodes 154, 160 of the two phase shifters 150, 156 are driven by the second frequency component 114N+, 114N−, which has a narrow frequency band only. Accordingly, in this example it is proposed that the signal quality within the paths for this narrowband frequency could be enhanced by applying microwave resonant techniques to the design of the relevant electrodes (that is, those electrodes driven by narrow band frequency components). Therefore, the termination module comprises a microwave stub 174, 176 for each of the electrodes 154, 160 driven by a narrow band driving signal. The stubs are configured so that the physical length of the electrodes is resonant at the intended frequency, that is the frequency or frequency range of the driving signal intended to be supplied to it. This can equalise the inherent RF loss in the electrodes. Resonant techniques are not applicable to broadband frequency ranges since only a limited frequency range is able to resonate for a given physical size of electrode. Hence, the use of microwave stubs for reduced attenuation is a benefit conferred by the use of frequency slicing.

The FIG. 5 and FIG. 7 examples use only the frequency-sliced components of the original electrical signal to drive the phase shifter electrodes. The concept is not limited in this regard, however, and other pairings of driving signals can be applied to the phase shifters.

Figure 8:
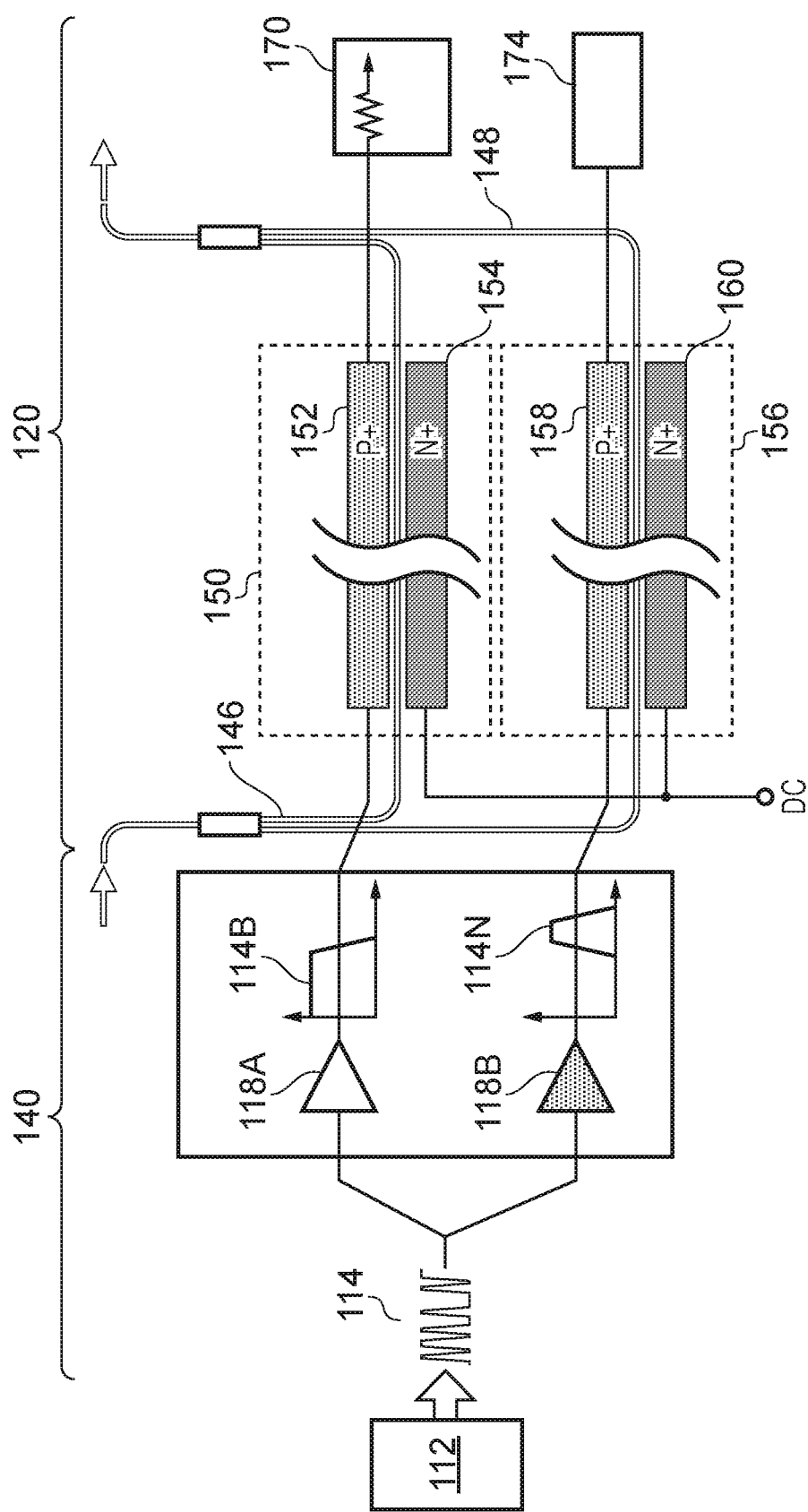
FIG. 8 shows a schematic representation of an optical modulation system according to a third embodiment using two frequency components.

FIG. 8 shows a schematic representation of a further example modulation system, comprising as before a signal source 140 and a modulator 120. The modulator 120 is configured as before with a phase shifter 150, 156 for each arm or pathway 146, 148 of the modulator 120. Each phase shifter comprises a pair of electrodes 152, 154 and 158, 160 as before. The signal generator 112 generates an amplitude modulated electrical signal 114 with a bandwidth, as before, using any desired modulation scheme. Again as before, the electrical signal is sliced or divided into two frequency components covering different portions of the bandwidth. These may be any two components, or may be a broader first component and a narrower second component, such as the two frequency components of the OOK signal shown in FIG. 4. In this example, no positive/negative versions of the frequency components are output, so that one first frequency component 114B and one second frequency component 114N only are used as driving signals. Hence, only two amplifiers 118A and 118B are included in the signal source 140. A first amplifier 118A receives and amplifies the first, broader, frequency component 114B, and is hence designed for optimum performance across the relevant bandwidth. A second amplifier 118B receives and amplifies the second, narrower, frequency component 114N, and is hence designed for optimum performance across that specific narrow range of frequencies.

The first frequency component 114B is supplied as a driving signal to the first electrode 152 of the first phase shifter 150. The second frequency component 114N is supplied to the first electrode 158 of the second phase shifter 156. In this example, the first electrodes 152, 158 are p+ doped regions of silicon, but the frequency component driving signals could alternatively by provided to the second electrodes 154, 160 of n+ doped regions. In other doping arrangements or non-semiconductor-based modulators, the two frequency components could similarly be supplied to either electrode of the electrode pairs. The remaining electrodes, being in this example the second electrodes 154, 160 of the two phase shifters 150, 156, are each supplied with a direct current (DC) bias in this example. Hence, each phase shifter receives a pair of driving signals comprising one frequency component driving signal derived from frequency slicing of the original amplitude modulated electrical signal and one DC bias input, where each phase shifter receives a different frequency component driving signal. In this way, all the frequency components are used as driving signals and therefore the full broadband spectrum is represented in the modulation process, and each phase shifter is driven by a different pair of driving signals to create the required phase difference between the light propagating in the two pathways 146, 148.

To further optimise the system for operation with the different frequency components, the first electrode 152 of the first phase shifter 150 which is driven by the broader first frequency component 114B is terminated in a regular earth termination 170. The first electrode 158 of the second phase shifter 156 which is driven by the narrow second frequency component 114N is terminated with a microwave stub 174 configured to tune the first electrode 158 for resonance within the bandwidth of the second frequency component 114N, to minimise RF losses and improve the quality of the voltage difference across the electrodes 158, 160 of the second phase shifter 156. This is not essential however, and the electrode 158 driven by the narrow frequency component 114N could alternatively have an earth termination as in the FIG. 5 example. The second electrodes, connected to the DC bias, require no termination.

Accordingly, the pair of electrodes in a phase shifter of the modulator can be driven by a frequency component driving signal in conjunction with a DC bias, or by two different frequency component driving signals. The frequency component driving signals can be used once each only, or one or more of the frequency component driving signals can be replicated in an inverse arrangement so as to give both a positive-going version and a negative-going version of the same signal, both of which can be used to drive electrodes in different phase shifters.

While the examples thus far have considered slicing the original amplitude modulated electrical signal into two frequency components, the concept can be extended to handle additional frequency components. This may be useful if the original electrical signal is exceptionally ultra broadband, or to enable narrower frequency components to be used so that the amplifiers and the electrodes can be designed and tuned for maximum performance at the relevant frequencies, since amplifier performance can be better the narrower the frequency range the amplifier handles. The phase shifters described so far each comprise two electrodes, giving a total of four electrodes. The FIG. 5 and FIG. 8 examples show alternatives for driving these four electrodes with two frequency components. To accommodate additional frequency components, each of the four electrodes can be driven with an entirely different signal, such as four different frequency components each covering a different portion of the bandwidth of the electrical signal, or three different frequency components each covering a different portion of the bandwidth of the electrical signal plus a DC bias.

As an alternative, and to enable any number of frequency components to be utilised, at least one pathway through the modulator may be provided with a phase shifter that comprises two or more segments. Each segment comprises a separate pair of electrodes disposed oppositely across the optical pathway as before, with the segments themselves disposed in series along the length of the optical pathway. The electrodes of each segment are electrically isolated from one another (except in arrangements where electrodes are connected to a DC bias, where all such electrodes can be connected together). Hence, each segment can be driven by a different driving signal. In the present context, this allows multiple frequency components derived from frequency slicing of an original signal to be used to drive the modulator. Electro-optic modulators with segmented electrodes are known for use in pulse amplitude modulation schemes, for example [5, 6].

Figure 9:
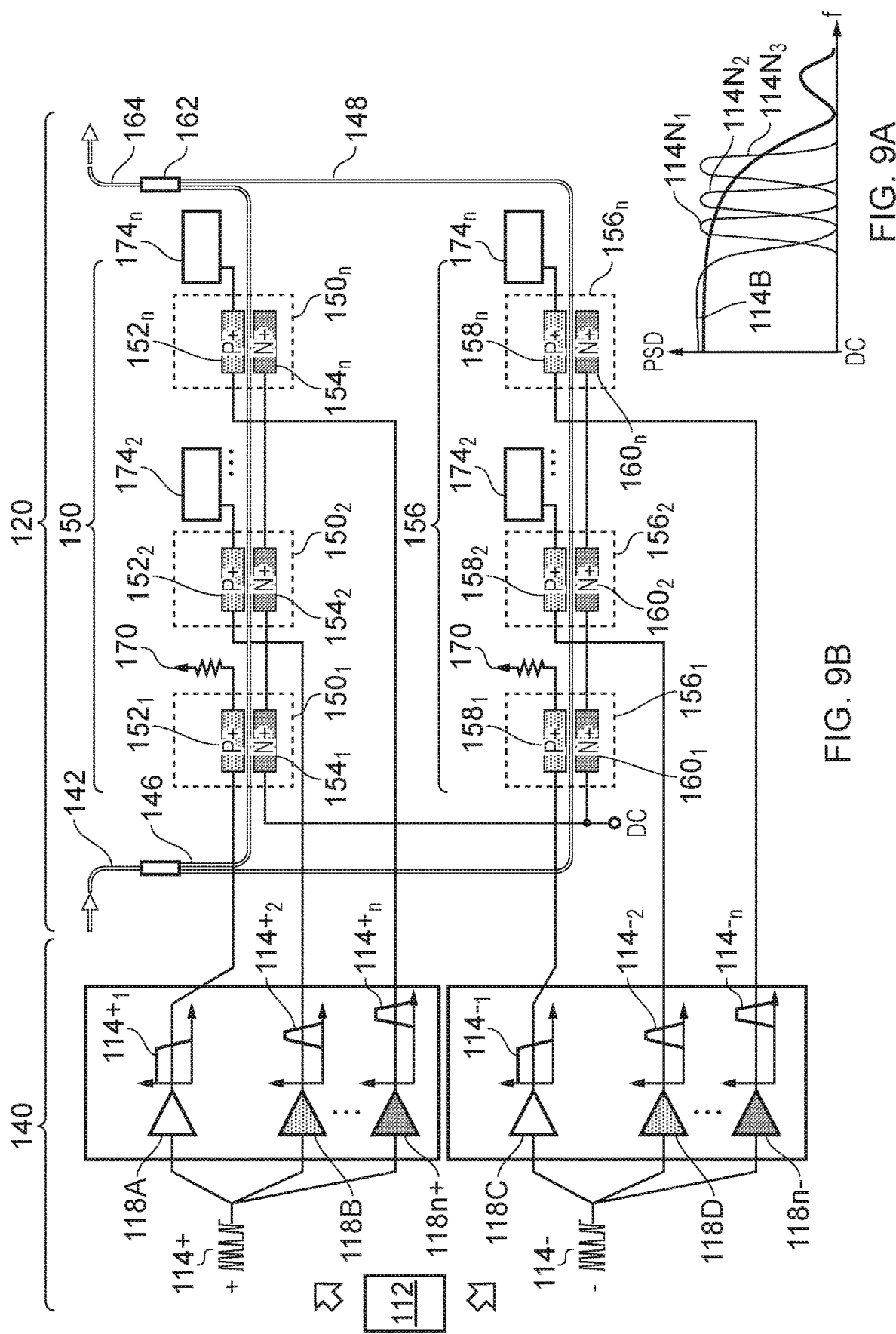
FIG. 9A shows a graph of the power spectral distribution of an example signal for OOK amplitude modulation divided into four frequency components suitable for use in methods and systems according to some embodiments.
FIG. 9B shows a schematic representation of an optical modulation system according an embodiment using multiple frequency components.

FIG. 9A shows an example of an OOK signal which is sliced into multiple frequency components, in this case four. As in the previous examples, a first component 114B occupies the portion of the total bandwidth from the DC bias upwards, and has a broader bandwidth than other frequency components. Centred at successively higher frequencies, and arranged adjacently with some overlap so as to fully cover the original bandwidth, there are three narrower frequency components $114N_1$, $114N_2$ and $114N_3$. These components have roughly similar bandwidths, which are narrow in the sense that they are narrower than the broader component 114B. However, the narrowband components need not each have the same bandwidth. Also, the first component need not be broader; all components might have substantially the same width, or differences in width are such that no component is significantly wider than the others. The broadest component need not be at the lowest frequency range. The original signal need not be an OOK signal; the slicing can be applied to electrical signals according to any modulation scheme. Also, the slicing can be performed to divide the bandwidth into any number of frequency components, which for convenience can be designated as $114_1$ (a first frequency component) to $114_n$ (an nth frequency component). The components need not be consecutive/adjacent.

FIG. 9B shows a schematic representation of an example optical modulator system configured for use with multiple frequency components. The signal source 140 comprises a signal generator 112 as before which generates an amplitude modulated electrical signal according to some known modulation scheme, which is provided as a positive version 114+ and 114− as before, as well as being sliced in the frequency domain in frequency components $114_1$ to $114_n$. Each component in each of the positive and negative versions is provided to a separate amplifier configured for operation at the relevant frequencies covered by the relevant frequency component, to generate amplified frequency components for use as driving signals for the electrodes of the modulator 120, as in previous examples. Hence, a first amplifier 118A receives a positive first frequency component $114+_1$, a second amplifier 118B receives a positive second frequency component $114+_2$, a first nth amplifier 118n+ receives a positive nth frequency component $114+_n$, a third amplifier 118C receives a first negative frequency component $114-_1$, a fourth amplifier 118D receives a second negative frequency component $114-_2$, and a second nth amplifier 118n− receives a negative nth frequency component $114-_n$, with additional amplifiers for any components between the second and the nth components in the positive and negative regimes (indicated by . . . in FIG. 9B).

The modulator 120 is configured as before with two optical pathways 146, 148 extending between an input waveguide 142 and an output waveguide 164. Each pathway has a phase shifter 150, 156 comprising multiple electrode segments (where each segment comprising a pair of electrodes can be considered as an additional phase shifter for that pathway). The first phase shifter 150 has n segments $150_1$ to $150_n$, each comprising a first electrode $152_1$ to $152_n$ and a second electrode $154_1$ to $154_n$. The second phase shifter 156 has n segments $156_1$ to $156_n$, each comprising a first electrode $158_1$ to $158_n$ and a second electrode $160_1$ to $160_n$.

The positive driving signals are supplied to the electrode segments of the first phase shifter 150, such that each first electrode is driven by a different positive frequency component. Hence, the first electrode $152_1$ of the first segment $150_1$ of the first phase shifter 150 receives the positive first frequency component $114+_1$, the first electrode $152_2$ of the second segment $150_2$ of the first phase shifter 150 receives the positive second frequency component $114+_2$, and the first electrode $152_n$ of the nth segment $150_n$ of the first phase shifter 150 receives the positive nth frequency component $114+_n$. Each of the second electrodes $154_1$ to $154_n$ of the segments $150_1$ to $150_n$ is connected to a DC bias. For optimisation of the first electrode performance, the first electrode $152_1$ of the first segment $150_1$ is terminated to earth by a terminator 170. The first electrode $152_2$ of the second segment $150_2$ is provided with a microwave stub $174_2$ tuned for resonance with the second frequency component $114_2$. The first electrode $152_n$ of the nth segment $150_n$ is provided with a microwave stub $174_n$ tuned for resonance with the nth frequency component $114_n$.

The negative driving signals are supplied to the electrode segments of the second phase shifter 156, such that each first electrode is driven by a different negative frequency component. Hence, the first electrode $158_1$ of the first segment $156_1$ of the second phase shifter 156 receives the negative first frequency component $114-_1$, the first electrode $158_2$ of the second segment $156_2$ of the second phase shifter 156 receives the negative second frequency component $114-_2$, and the first electrode $158_n$ of the nth segment $156_n$ of the second phase shifter 158 receives the negative nth frequency component $114-_n$. Each of the second electrodes $160_1$ to $160_n$ of the segments $156_1$ to $156_n$ is connected to a DC bias. For optimisation of the first electrode performance, the first electrode $158_1$ of the first segment $156_1$ is terminated to earth by a terminator 170. The first electrode $158_2$ of the second segment $156_2$ is provided with a microwave stub $174_2$ tuned for resonance with the second frequency component $114_2$. The first electrode $158_n$ of the nth segment $156_n$ is provided with a microwave stub $174_n$ tuned for resonance with the nth frequency component $114_n$.

For either or both phase shifters 150, 156, the microwave stubs may be omitted and earth terminations used instead for the narrower frequency component electrodes if the RF losses arising from lack of resonance can be tolerated. Also, microwave stubs may be used to terminate the electrodes driven by the first frequency components if these components cover a sufficiently narrow portion of the bandwidth that a useful resonance can be achieved.

In this way, all the n frequency components into which the amplitude modulated electrical signal is sliced are modulated onto the optical signal, and recombined when the two parts of the optical signal from the two modulator pathways 146, 148 are coupled into the optical output 164 by the combining optical coupler 162.

While the examples discussed so far have been presented largely in the context of telecommunications, in which there is a requirement to transfer the modulation pattern of a broadband electrical signal onto a broadband optical signal, the frequency slicing approach is also applicable in the field of microwave photonics. The low loss and wide bandwidth available from optoelectronic systems and devices such as electro-optic modulators makes them suitable for handling microwave signals. In the present case, the frequency components may each be a narrowband component in the microwave frequency domain (generally considered to be between about 300 MHz and 300 GHz). This makes it possible to modulate multiple microwave frequency components onto the optical domain, by using microwave frequency components as the driving signals for the modulator electrodes.

Figure 10:
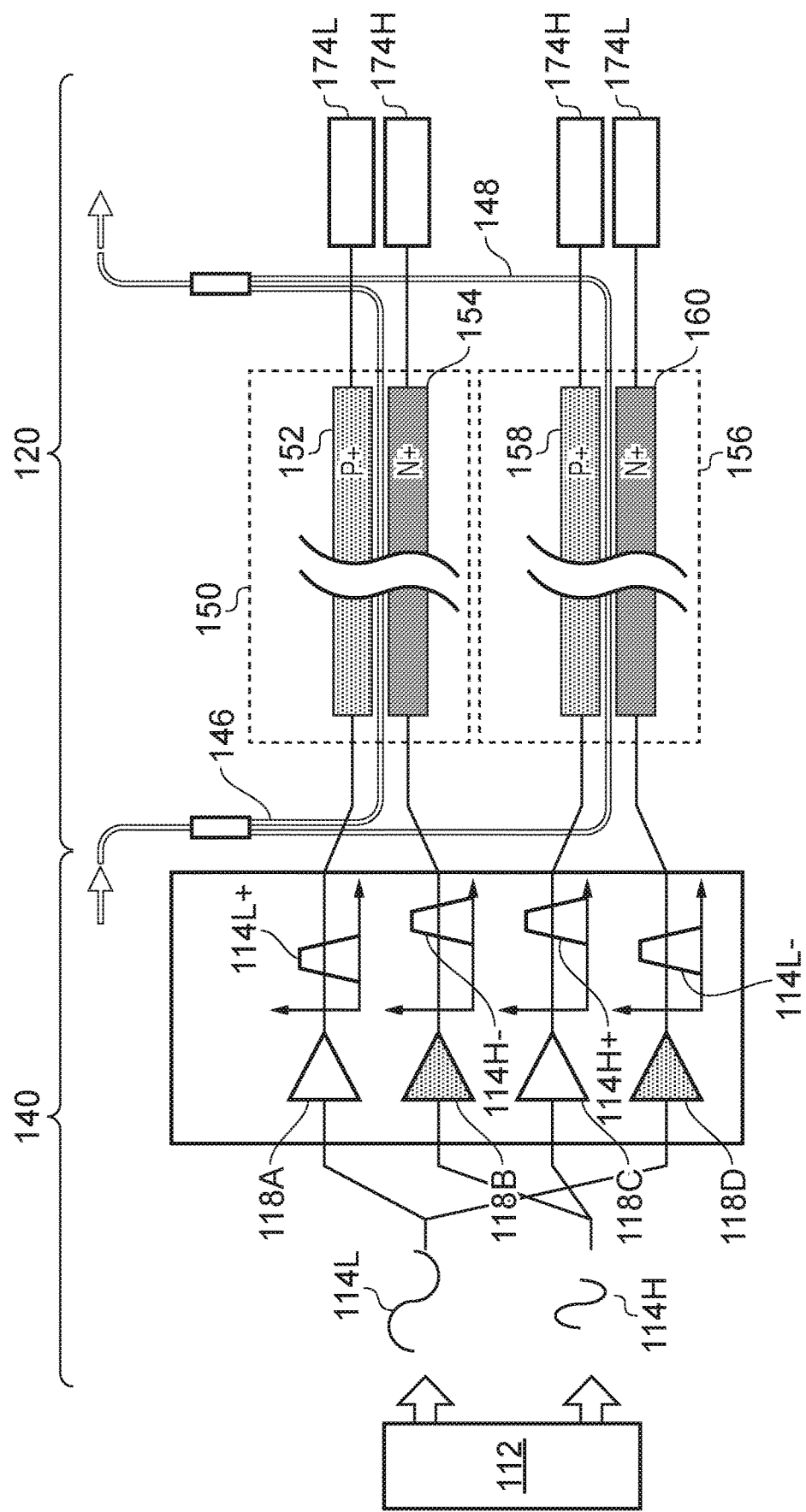
FIG. 10 shows a schematic representation of an optical modulation system according to an embodiment using microwave frequency components.

FIG. 10 shows a schematic representation of an example modulator system using microwave frequency driving signals. The signal source 140 comprises one or more microwave generators 112 configured to generate (either separately or by frequency slicing of a broader bandwidth signal) a first microwave frequency component 114L with a first frequency or narrowband frequency range, and a second microwave frequency component 114H with a second frequency or narrowband frequency range which is higher than the frequency of the first microwave frequency component. Thus we can consider the first frequency component to be a low frequency component and the second frequency component to be a high frequency component, where the high frequency or frequency range is higher than the low frequency or frequency range. Both components 114L, 114H are provided in both a positive-going version and a negative-going version, to give four signals, each of which are passed to a dedicated amplifier configured to amplify the relevant frequency range and output an amplified signal for use as a modulator driving signal. Hence, a first amplifier 118A receives and amplifies the positive low first frequency component 114L+, a second amplifier 118B receives and amplifies the negative high second frequency component 114H−, a third amplifier 118C receives and amplifies the positive high second frequency component 114H+ and a fourth amplifier receives and amplifies the negative low first frequency component 114L−.

The modulator 120 has the same format as previous examples, with a first phase shifter 150 with first and second electrodes 152, 154 arranged on a first optical pathway 146 and a second phase shifter 156 with first and second electrodes 158, 160 arranged on a second optical pathway 148. The first phase shifter 150 is driven by the positive low first frequency component 114L+ at its first electrode 152 and the negative high second frequency component 114H− at its second electrode 154. Conversely, the second phase shifter is driven by the positive high second frequency component 114H+ at its first electrode 158 and the negative low first frequency component 114L− at its second electrode 160. Hence, each phase shifter 150, 156 is driven by a different combination of driving signals, and both frequency components are included in the driving signals, as before.

Since all the frequency components are narrowband, resonant techniques can be used to reduce RF losses in all the electrodes. Hence, the first electrode 152 of the first phase shifter 150 and the second electrode 160 of the second phase shifter 156, both of which are driven at the low first frequency, are each provided with a terminating microwave stub 174L configured to give the electrodes resonance at the frequency of the low first frequency component 114L. The second electrode 154 of the first phase shifter 150 and the first electrode 158 of the second phase shifter 156, both of which are driven at the high second frequency, are each provided with a terminating microwave stub 174H configured to give the electrodes resonance at the frequency of the high second frequency component 114H.

The frequency slicing concept is not limited to travelling wave optical devices, and can also be applied to lumped element devices, where lumped elements are considered to be passive devices including resistors, capacitors and inductors. In such devices, capacitance of the junction in the phase shifters can be a significant factor in limiting the bandwidth that can be processed. A simple inductor-capacitor (LC) resonant circuit can be added to extend the bandwidth of the optical modulator.

Figure 11:
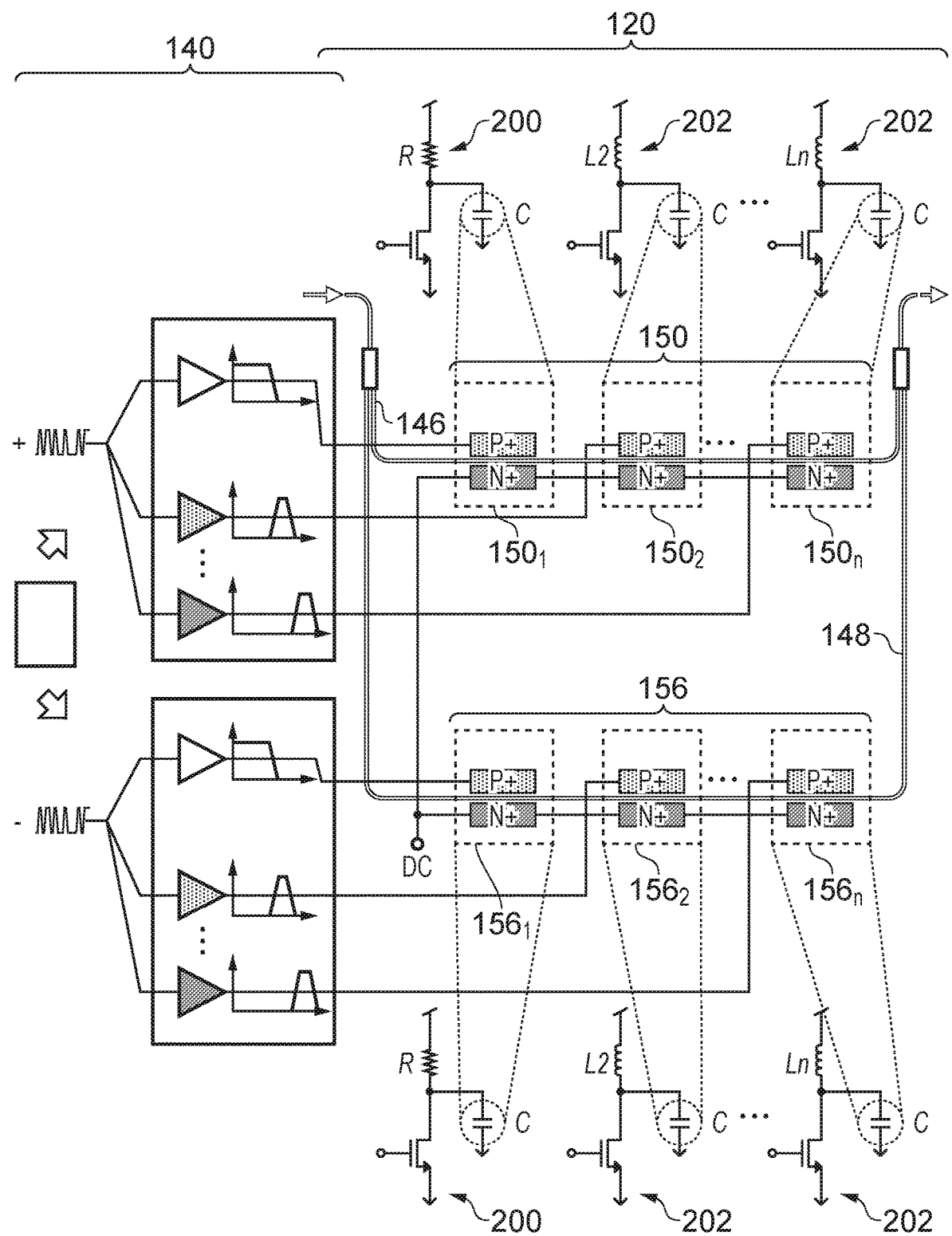
FIG. 11 shows a schematic representation of an optical modulation system according to an embodiment with an electro-optic modulator comprising lumped electronics.

FIG. 11 shows a schematic representation of an example system using lumped elements. The system comprises a signal source 140 and a modulator 120 as before, and is generally similar to the system shown in FIG. 9B. However, each of the segments $150_1$ to $150_n$ making up the first phase shifter 150 in the first optical path 146, and each of the segments $156_1$ to $156_n$ making up the second phase shifter 156 in the second optical path 148, is implemented using lumped elements. The first segments $150_1$ and $156_1$ which, as before, are driven by the first frequency component with the broader bandwidth, are configured as resistor-capacitor resonant circuits 200. The second and subsequent segments $150_2$ to $150_n$ and $156_2$ to $156_n$ are driven by the second and subsequent frequency components having narrow bandwidths, and are configured as inductor-capacitor resonant circuits 202. In each circuit 200, 202 the capacitor C comprises a junction of p+ and n+ material forming the electrode pair of each phase shifter segment (as in the previous examples). The capacitor C could be implemented as a carrier accumulation based silicon-insulator-silicon capacitor (SISCAP) or metal oxide semiconductor capacitor (MOSCAP), or a carrier depletion type modulator, or a carrier injection modulator, or other capacitor types which will be apparent to the skilled person.

A typical example of a lumped element-based optical phase shifter which can be used for each of the phase shifter segments is the "carrier accumulation based silicon-insulator-silicon capacitor" (SISCAP) [7]. This kind of phase shifter can provide exceptional modulation efficiency, and consequently also significantly smaller physical dimensions (smaller than hundreds of micrometres). This is less than one-tenth of the free-space wavelength of the electrical signal which is modulated by the phase shifter. However, in conventional systems, a problem is that its relatively large capacitance (for example, several pF/mm) can limit the achievable electro-optic bandwidth and makes practical difficulties in building a working device configured for example as a 50-ohm microwave transmission line.

However, by using the frequency slicing technique proposed herein, each SISCAP providing one segment of the phase shifter only contributes a part of the overall capacitance, and each need only handle a narrow frequency bandwidth. Hence, the total electro-optic bandwidth can be significantly enhanced. The amplifiers associated with each segment may be designed either as a broadband amplifier, or a narrow band amplifier in which the inductance (L2 to Ln of the circuits 202) of the load inductor may be purposely designed for a specific resonant frequency f (where f=1/(2*pi*sqrt(LC))). This provides an equivalent effect to the microwave resonant stubs of the FIG. 9B system.

FIG. 11 is an example system only. The details of the implementation of the circuits can be different for other systems depending on the desired specification and integrated circuit processes used.

Each of the example systems in FIGS. 7, 8, 9B and 10 includes microwave stubs terminating one or more of the electrodes, for the purpose of achieving resonance at the frequency or frequency range of the electrical driving signal in order to combat RF losses for narrow band frequency components. As described above, the frequency at which resonance occurs is determined largely by the physical dimensions of the electrode and its associated stub, and is hence a fixed value for a given electrode and stub architecture.

This fixed resonance inhibits flexibility; the physical dimensions are hard to change after fabrication, so that a given phase shifter is optimised for loss reduction at only one frequency or frequency band. Running a modulation system with other driving signal frequencies will therefore incur higher losses.

It is proposed herein that this can be addressed in systems comprising phase shifters implemented in semiconductor materials and in which one electrode in the electrode pair is driven with a bias voltage (the DC bias voltage or signal in the FIGS. 8 and 9B examples). If the bias voltage is altered, the capacitance of the junction in the semiconductor material (formed by the p+ and n+ material in the electrode pair) changes, because the intrinsic width of the junction is altered. The change in junction capacitance leads to a change in the propagation speed of the electrical signal travelling through the electrodes. For a fixed electrode/stub length, a different propagation speed corresponds to a different resonant frequency. Hence, the resonant frequency can be tuned by tuning (changing, varying or altering) the bias voltage of the electrode pair. The phase shifter can therefore be adapted for low-loss operation over a range of driving signal frequencies.

Figure 12:
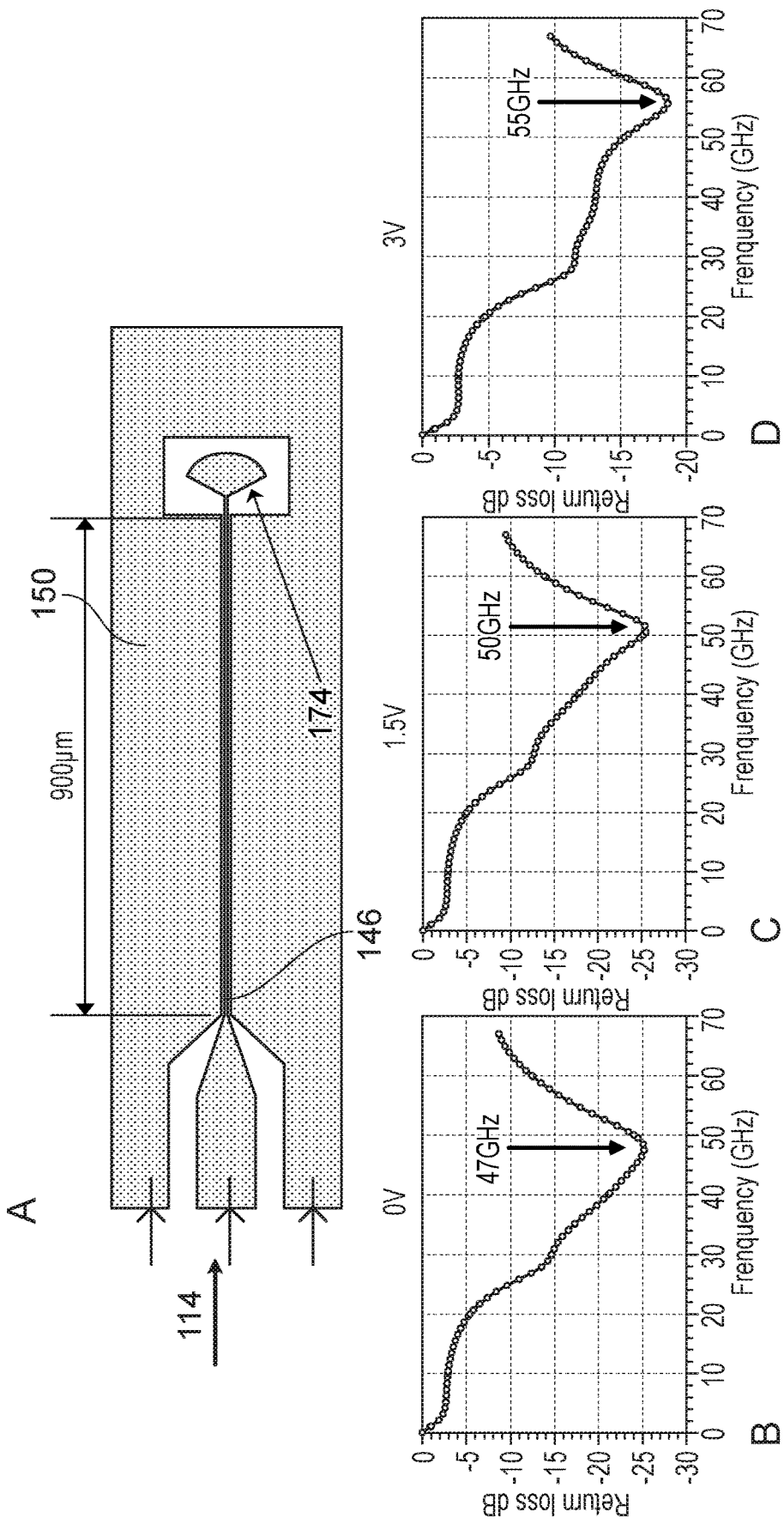
FIGS. 12A-12D show a plan view of an example modulator electrode and results of a simulation of resonant frequency tuning in the electrode according to an embodiment.

FIG. 12 shows a plan view of an example phase shifter, together with results of a simulation carried out to investigate this resonance tuning technique. FIG. 12A shows a plan view of an example of an arm of an electro-optic modulator which was used for the simulation. The modulator is formed from semiconductor material and hence operates via carrier depletion, and comprises a phase shifter 150 of 900 μm length (along the direction of propagation of the optical and electrical signals) which is embedded within a coplanar waveguide (CPW) structure (optical pathway 146), and terminated with a microwave stub 174. The incident electrical signal 114 applied to the phase shifter 150 will be resonant at a specific frequency, determined mainly by the physical dimensions of the phase shifter electrodes and the microwave stub 174. However, as mentioned above, changing a reverse bias voltage applied to the phase shifter changes the width and capacitance of the p-n junction defined by the pair of electrodes in the phase shifter 150, which is turn changes the propagation speed of the electrical signal 114 and hence the resonant frequency. FIGS. 12B, 12C and 12D show graphs of results from a computer simulation of tuning of the resonant frequency of the modulator of FIG. 12A. The graphs plot the variation of return loss (in dB) with frequency of the electrical signal (in GHz), obtained for different values of the bias voltage. When resonance of the electrical signal is achieved, the return loss is minimised, so the resonant frequency can be identified at the minimum in each graph. FIG. 12B shows the return loss at a reverse bias of 0 V, at which the resonance occurs at 47 GHz. FIG. 12C shows the return loss at a reverse bias of 1.5 V, at which the resonance occurs at 50 GHz. FIG. 12D shows the return loss at a reverse bias of 3 V, at which the resonance occurs at 55 GHz. Thus, a tuning range of only 3 V for the bias voltage covers a range of 8 GHz (47 to 55 GHz) variation in the resonant frequency. The tuning capability and effect can be modified or tailored according to requirements by the use of different semiconductor doping levels, reverse bias voltages and electrode configurations.

This clearly illustrates that the resonant frequency of the phase shifter can be readily tuned by altering the bias voltage. The bias signal can be selected to provide a chosen resonant frequency according to the frequency applied electrical signal. Hence, the phase shifter can be modified to provide optimum low loss performance for different applied electrical signal frequencies. This is applicable for real-world systems such as an optical telecommunications link that may need to be operable at different speeds or over different frequency ranges. The tunability describes provides enhanced flexibility in such systems.

Note that the amplitude modulated electrical signal may be generated as a broadband signal which is then sliced or divided into the required frequency components (which are then optionally amplified as noted above), or alternatively, the required frequency components may be generated directly, so that the slicing or dividing step by which the frequency ranges or bandwidths of each component are designated is performed theoretically as a first step before the generating components are operated. References herein to "slicing" and "dividing" are intended to include both alternatives.

With regard to the terms "narrow", "narrow band", "broad" and "broadband" used herein, a useful definition to distinguish the two is that a narrow frequency bandwidth can be considered to cover a frequency range lying within one order of magnitude, for example 3 GHz to 8 GHz or 55 GHz to 65 GHz, whereas a broad frequency bandwidth can be considered to cover or extend over a frequency range of at least two orders of magnitude, for example 10 MHz to 1 GHz or 100 MHz to 50 GHz. The concept of narrow and broad bandwidths or frequency ranges can apply to the range of frequencies present in a signal, or to the frequency response or frequency handling capability of a device or component.

While the various embodiments described in detail above have included one or more phase shifters in both the first optical path and the second optical path of the electro-optic modulator, this is not essential. In other embodiments, the electro-optic modulator may comprise one or more phase shifters in only one of the first optical path and the second optical path, where, as before, the electrodes of the or each phase shifter receive a different pair of driving signals. With a single phase shifter, two different frequency components can be used to drive the two electrodes of the phase shifter, in order to implement the frequency slicing approach. The other arm or optical path of the electro-optic modulator can comprise a simple waveguide only, providing no active phase modulation.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] Cheng Wang et al, "Integrated lithium niobate electro-optic modulators operating at CMOS-compatible voltages", Nature, vol. 562, pages 101-104, 2018
[2] Miaofeng Li et al, "Silicon intensity Mach-Zehnder modulator for single lane 100 Gb/s applications", Photonics Research, vol. 6(2), page 109, 2018
[3] Xi Chen et al, "All-electronic 100 GHz bandwidth digital-to-analog converter generating PAM signals up to 190 Gbaud", Journal of Lightwave Technology, vol. 35(3), pages 411-417, 2016
[4] D Hillerkuss, "High-quality optical frequency comb by spectral splicing of spectra broadened by SPM", IEEE Photonics Journal, vol. 5(5), 2013
[5] Michael Vanhoecke et al, "Segmented optical transmitter comprising a CMOS driver array and an InP IQ-MZM for advanced modulation formats", Journal of Lightwave Technology, vol. 35(4), 2017
[6] Iria Garcia Lopez et al, "High-speed ultralow-power hybrid optical transmitter module with InP I/Q-SEMZM and BiCMOS drivers with 4-b integrated DAC", IEEE TMTT, vol. 64(12), 2016
[7] Kapil Debnath et al, "All-silicon carrier accumulation modulator based on a lateral metal-oxide-semiconductor capacitor", Photonic Research, vol. 6(5), 2018
[8] US 2017/0075187
[9] GT Reed et al, "Silicon optical modulators", Nature Photonics, vol. 4, pages 518-526, 2010

The invention claimed is:

1. An optical modulation system comprising:
a signal source configured to generate an amplitude modulated electrical signal having a bandwidth and divided into frequency components comprising at least a first frequency component covering a first portion of the bandwidth and a second frequency component covering a second portion of the bandwidth; and
an electro-optic modulator for receiving an input optical signal, the modulator having a first optical path and a second optical path, the input optical signal being divided between the first optical path and the second optical path and recombined after propagation along the first optical path and the second optical path to produce an output optical signal, at least one of the first optical path and the second optical path comprising a phase shifter comprising a pair of electrodes in which each electrode is configured to receive a driving signal;
wherein the or each phase shifter is coupled to the signal source to receive at least one of said frequency components as a driving signal for an electrode, and the or each phase shifter is arranged such that the phase shifter receives different frequency components as a pair of driving signals, or each phase shifter receives a different pair of driving signals.

2. An optical modulation system according to claim 1, in which the first optical path comprises a phase shifter and the second optical path comprises a phase shifter.

3. An optical modulation system according to claim 2, in which the phase shifter of the first optical path receives a positive version of the first frequency component and a negative version of the second frequency component as its pair of driving signals, and the phase shifter of the second optical path receives a negative version of the first frequency component and a positive version of the second frequency component as its pair of driving signals.

4. An optical modulation system according to claim 2, in which the phase shifter of the first optical path receives the first frequency component and a direct current bias signal as its pair of driving signals, and the phase shifter of the second optical path receives the second frequency component and a direct current bias signal as its pair of driving signals.

5. An optical modulation system according to claim 2, in which:
the electro-optic modulator comprises an additional phase shifter in each of the first optical path and the second optical path; and
each phase shifter in the first optical path receives a positive version of one of the frequency components and a direct current bias signal as its pair of driving signals, and each phase shifter in the second optical path receives a negative version of one of the frequency components and a direct current bias signal as its pair of driving signals, such that both of the first frequency component and the second frequency component is received by one phase shifter in each of the first optical path and the second optical path.

6. An optical modulation system according to claim 2, in which:
the signal source is further configured to divide the amplitude modulated electrical signal into N-1 additional frequency components each covering a different portion of the bandwidth;
the electro-optical modulator comprises N additional phase shifters in each of the first optical path and the second optical path; and
each phase shifter in the first optical path receives a positive version of one of the frequency components and a direct current bias signal as its pair of driving signals, and each phase shifter in the second optical path receives a negative version of one of the frequency components and a direct current bias signal as its pair of driving signals, such that each frequency component is received by one phase shifter in each of the first optical path and the second optical path.

7. An optical modulation system according to claim 4, in which, in each phase shifter, the electrode pair comprises a semiconductor junction and the direct current bias signal can be selected in order to set a resonant frequency of the phase shifter to be resonant with the frequency component received by the phase shifter.

8. An optical modulation system according to claim 1, in which the first portion of the bandwidth covered by the first frequency component is broader than the second portion of the bandwidth covered by the second frequency component.

9. An optical modulation system according to claim 3, in which the amplitude modulated electrical signal is divided into a first frequency component and a second frequency component only, the first portion of the bandwidth being broader than the second portion of the bandwidth.

10. An optical modulation system according to claim 9, in which the amplitude modulated electrical signal is modulated with a symbol period T0 and corresponding frequency f0, the first portion of the bandwidth extending from a direct current value to substantially f0/3, and the second portion of the bandwidth is centred on f0/2.

11. An optical modulation system according to claim 6, in which the first portion of the bandwidth covered by the first frequency component is broader than the second portion of the bandwidth covered by the second frequency component and broader than each of the different portions of the bandwidth covered by the additional frequency components.

12. An optical modulation system according to claim 1, in which each of the first frequency component, the second frequency component and any additional frequency components covers a portion of the bandwidth which is substantially the same width as the other portions.

13. An optical modulation system according to claim 1, in which the first frequency component, the second frequency component and any additional frequency components cover adjacent portions of the bandwidth.

14. An optical modulation system according to claim 7, in which the electro-optic modulator additionally comprises a microwave resonant stub to terminate each electrode which receives a frequency component, other than the electrode or electrodes which receive the first frequency component in cases where the first portion of the bandwidth is broader.

15. An optical modulation system according to a claim 1, in which the signal source comprises, for each frequency component, an amplifier configured to amplify the frequency component before the frequency component is received at an electrode or electrodes of the phase shifters.

16. An optical modulation system according to claim 15, in which at least one amplifier comprises a variable gain amplifier, or an amplifier in combination with a gain control unit.

17. An optical modulation system according to claim 15, in which at least one amplifier comprises a variable time delay amplifier, or an amplifier in combination with a time delay control unit.

18. An optical modulation system according to claim 1, in which the electro-optic modulator comprises a Mach-Zehnder modulator.

19. An optical modulation system according to claim 1, in which the electro-optic modulator is formed from silicon, or from Group III and Group V semiconductor materials, or from lithium niobate.

20. An optical modulation system according to claim 1, in which the electro-optic modulator and at least some of the signal source are fabricated monolithically on a common substrate.

21. An optical modulation system according to claim 1, in which the or each phase shifter comprises a resistor-capacitor resonant circuit or an inductor-capacitor resonant circuit.

22. An optical modulation system according to claim 1, in which the signal source is additionally configured to generate the amplitude modulated electrical signal such that the frequency components have different modulation patterns.

23. A method of modulating an optical signal, comprising:
generating an amplitude modulated electrical signal having a bandwidth and divided into frequency components comprising at least a first frequency component covering a first portion of the bandwidth and a second frequency component covering a second portion of the bandwidth;
passing an input optical signal into an electro-optic modulator having a first optical path and a second optical path arranged such that the input optical signal is divided between the first optical path and the second optical path and recombined after propagation along the first optical path and the second optical path to produce an output optical signal, wherein at least one of the first optical path and the second optical path comprises a phase shifter comprising a pair of electrodes in which each electrode is configured to receive a driving signal; and
supplying each electrode in the or each phase shifter with a driving signal such that the or each phase shifter receives at least one of said frequency components as a driving signal, and the phase shifter receives different frequency components as a pair of driving signals, or each phase shifter receives a different pair of driving signals so as to produce a phase difference between the optical signal after propagation along the first optical path and the optical signal after propagation along the second optical path.

24. A method according to claim 23, in which the first optical path comprises a phase shifter and the second optical path comprises a phase shifter.

25. A method according to claim 24, comprising supplying the phase shifter of the first optical path with a positive version of the first frequency component and a negative version of the second frequency component as its pair of driving signals, and supplying the phase shifter of the second optical path with a negative version of the first frequency component and a positive version of the second frequency component as its pair of driving signals.

26. A method according to claim 24, comprising supplying the phase shifter of the first optical path with the first frequency component and a direct current bias signal as its pair of driving signals, and supplying the phase shifter of the second optical path with the second frequency component and a direct current bias signal as its pair of driving signals.

27. A method according to claim 24, in which the electro-optic modulator comprises an additional phase shifter in each of the first optical path and the second optical path; and the method comprising:
supplying each phase shifter in the first optical path with a positive version of one of the frequency components and a direct current bias signal as its pair of driving signals, and supplying each phase shifter in the second optical path with a negative version of one of the frequency components and a direct current bias signal as its pair of driving signals, such that both of the first frequency component and the second frequency component are received by one phase shifter in each of the first optical path and the second optical path.

28. A method according to claim 24, in which the electro-optical modulator comprises N additional phase shifters in each of the first optical path and the second optical path; and the method further comprising:
dividing the amplitude modulated electrical signal into N-1 additional frequency components each covering a different portion of the bandwidth;
and supplying each phase shifter in the first optical path with a positive version of one of the frequency components and a direct current bias signal as its pair of driving signals, and supplying each phase shifter in the second optical path with a negative version of one of the frequency components and a direct current bias signal as its pair of driving signals, such that each frequency component is received by one phase shifter in each of the first optical path and the second optical path.

29. A method according to claim 26, in which the electrode pair of each shifter comprises a semiconductor junction and the method further comprises, for each phase shifter, selecting a value of the direct current bias signal in order to set a resonant frequency of the phase shifter to be resonant with the frequency component supplied to the phase shifter.

30. A method according to claim 23, in which the first portion of the bandwidth covered by the first frequency component is broader than the second portion of the bandwidth covered by the second frequency component.

31. A method according to claim 25, in which the amplitude modulated electrical signal is divided into a first frequency component and a second frequency component only, the first portion of the bandwidth being broader than the second portion of the bandwidth.

32. A method according to claim 31, in which the amplitude modulated electrical signal is modulated with a symbol period T0 and corresponding frequency f0, the first portion of the bandwidth extending from a direct current value to substantially f0/3, and the second portion of the bandwidth is centred on f0/2.

33. A method according to claim 28, in which the first portion of the bandwidth covered by the first frequency component is broader than the second portion of the bandwidth covered by the second frequency component and broader than each of the different portions of the bandwidth covered by the additional frequency components.

34. A method according to claim 29, further comprising providing the electro-optic modulator with a microwave resonant stub to terminate each electrode which receives a frequency component, other than the electrode or electrodes which receive the first frequency component in cases where the first portion of the bandwidth is broader.

35. A method according to claim 23, further comprising passing each frequency component through an amplifier configured to amplify the frequency component before supplying the frequency component to an electrode or electrodes of the phase shifters.

36. A method according to claim 35, comprising passing at least one frequency component through a variable gain amplifier or an amplifier in combination with a gain control unit.

37. A method according to claim 35, comprising passing at least one frequency component through a variable time delay amplifier or an amplifier in combination with a time delay control unit.

38. A method according to claim 23, comprising generating the amplitude modulated electrical signal such that the frequency components have different modulation patterns.

* * * * *